(12) United States Patent
Eber et al.

(10) Patent No.: US 10,325,431 B2
(45) Date of Patent: Jun. 18, 2019

(54) MOBILE DEVICE, BASE STRUCTURE, SYSTEM AND METHOD FOR RECOVERY OF 3D PARAMETERS OF LOW FREQUENCY MAGNETIC FIELD VECTORS

(71) Applicant: NXP B.V., Eindhoven (NL)

(72) Inventors: Wolfgang Eber, Graz (AT); Bernhard Spiess, Graz (AT); Marcin Tomasz Bawolski, Graz (AT); Matjaž Guštin, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/130,935

(22) Filed: Sep. 13, 2018

(65) Prior Publication Data
US 2019/0130683 A1   May 2, 2019

(30) Foreign Application Priority Data
Oct. 30, 2017   (EP) .................................... 17199292

(51) Int. Cl.
*G07C 9/00* (2006.01)
*H04B 7/00* (2006.01)
*B60R 25/24* (2013.01)

(52) U.S. Cl.
CPC .......... *G07C 9/00309* (2013.01); *B60R 25/24* (2013.01); *G07C 2009/00769* (2013.01)

(58) Field of Classification Search
CPC .. H04B 7/00; B60R 25/24; G07C 9/00; G01C 7/02; G01R 33/02

(Continued)

(56) References Cited

U.S. PATENT DOCUMENTS

| 5,153,583 A | * | 10/1992 | Murdoch ............. G06K 7/0008 |
| | | | 340/10.34 |
| 9,558,607 B2 | | 1/2017 | Eder |

(Continued)

FOREIGN PATENT DOCUMENTS

DE   102011079421 B4   1/2014

*Primary Examiner* — Nam V Nguyen
(74) *Attorney, Agent, or Firm* — Rajeev Madnawat

(57) ABSTRACT

Disclosed are: a mobile device, in particular a mobile Passive Keyless Entry, PKE, key device, and an associated method for providing 3D field values of a magnetic field H; an evaluation device for use in a PKE system having a Mobile device and an associated method for determining the direction of a magnetic field vector H=(x, y, z), which is present locally at a position of a 3D antenna of the mobile device; and a PKE system having a PKE base structure, to which preferably the mobile device is associated and which has at least a first base structure antenna, which is operable to emit the, particularly low frequency, magnetic field, the mobile PKE device and the evaluation unit. The mobile device and the associated method are characterized by providing, in addition to providing a first, second and third value $v_x$, $v_x$, and $v_x$ indicative of the local X-component x, Y-component y, and Z-component x of the magnetic field vector H, a sum value $v_S$ indicative of the sum $|S|=|x+y+z|$ of the local X-, Y-, and Z-components of the magnetic field vector H. The evaluation device and the associated method are characterized by providing the vector V yielded as a vector, which has the direction of the magnetic field vector H, and may be capable to discriminate, if a one-dimensional Relay Station Attack has occurred or if a regular wireless connection has been established between the PKE base structure and the associated mobile device.

16 Claims, 8 Drawing Sheets

(58) Field of Classification Search
USPC ....... 340/5.61, 686.6; 343/767; 342/458, 44; 455/404.1, 41.2, 418
See application file for complete search history.

(56) References Cited

U.S. PATENT DOCUMENTS

| | | | |
|---|---|---|---|
| 2008/0186197 A1* | 8/2008 | Rochelle | A01K 15/023 340/686.6 |
| 2009/0073072 A1* | 3/2009 | Lindenmeier | H01Q 1/3275 343/810 |
| 2011/0212699 A1* | 9/2011 | Howard | H04M 1/7253 455/404.1 |
| 2012/0229254 A1 | 9/2012 | Nowottnick | |
| 2016/0148448 A1 | 5/2016 | Blatz | |
| 2017/0050615 A1* | 2/2017 | Schindler | B60R 25/24 |
| 2017/0193717 A1 | 7/2017 | Kim | |

\* cited by examiner

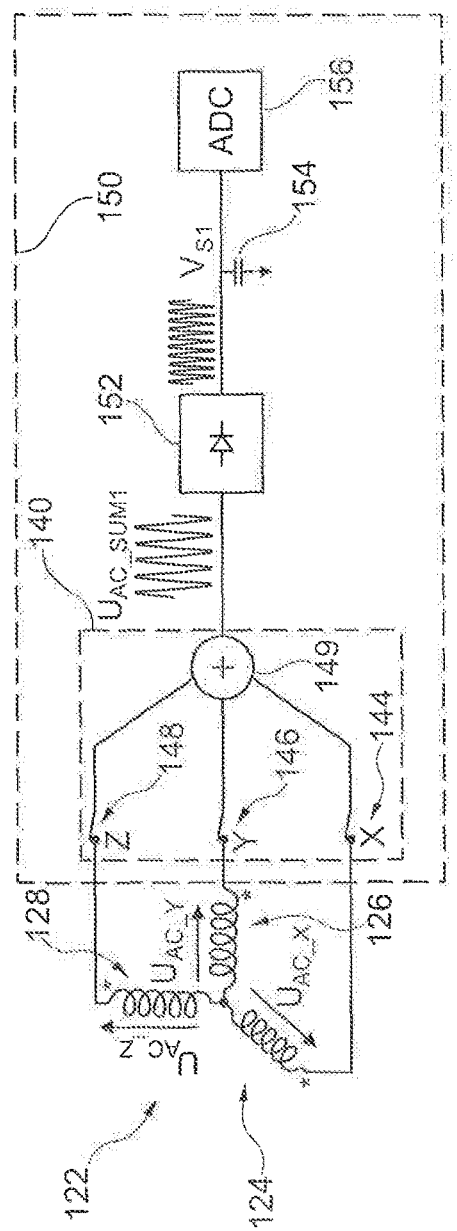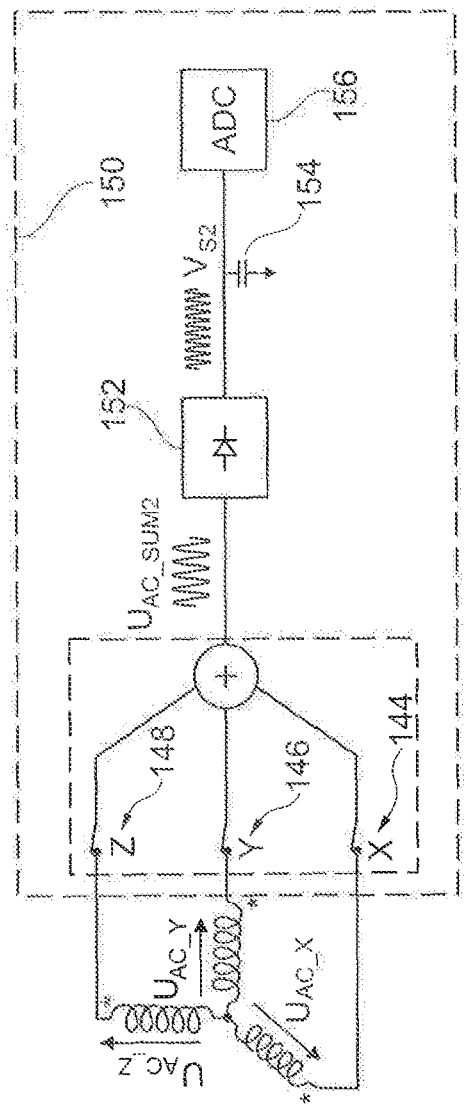
Fig. 5B
Fig. 5C

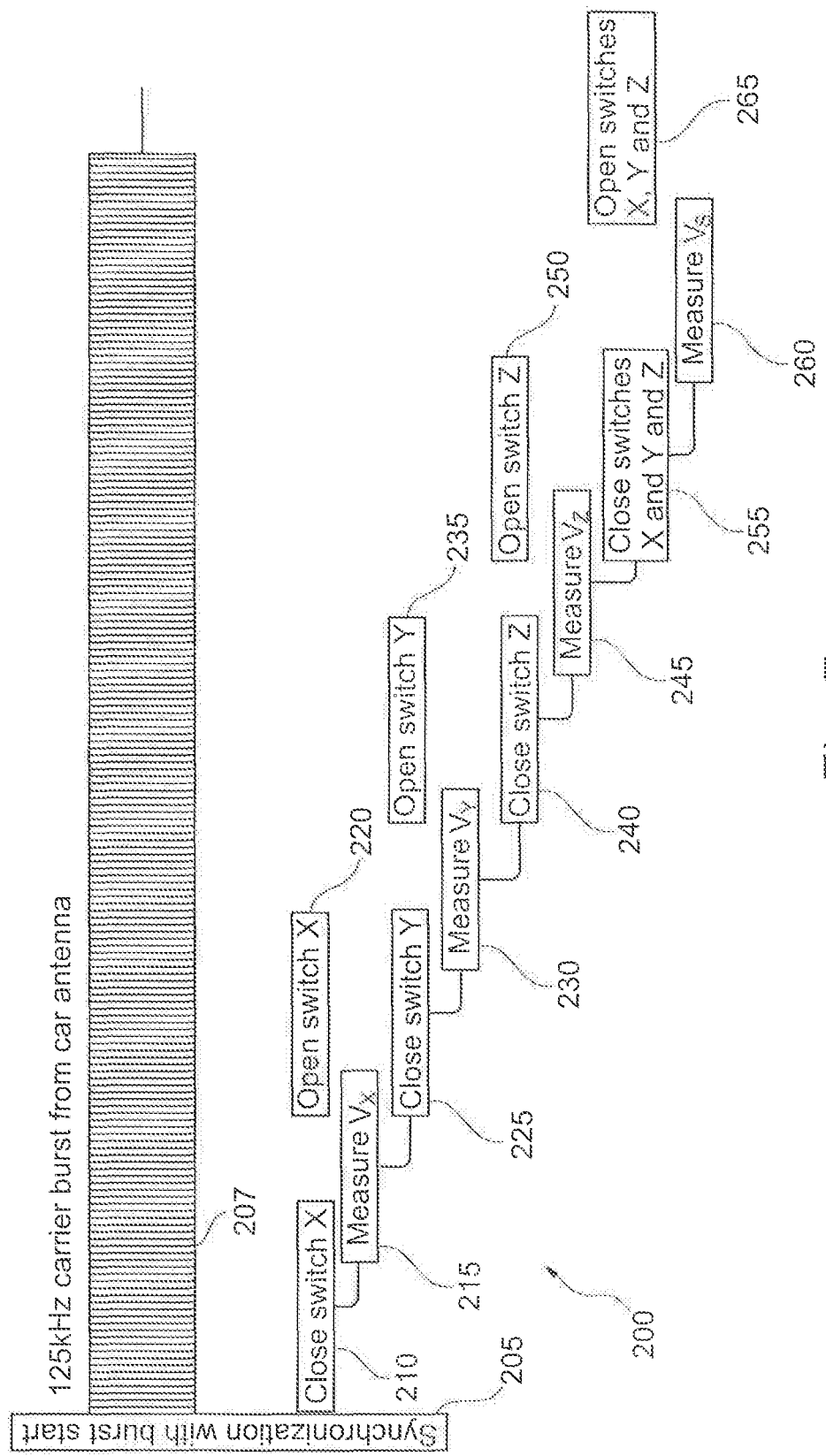

MOBILE DEVICE, BASE STRUCTURE, SYSTEM AND METHOD FOR RECOVERY OF 3D PARAMETERS OF LOW FREQUENCY MAGNETIC FIELD VECTORS

CROSS-REFERENCE TO RELATED APPLICATIONS

This application claims the priority under 35 U.S.C. § 119 of European Patent application no. 17199292.8, filed on Oct. 30, 2017, the contents of which are incorporated by reference herein.

TECHNICAL AREA

The invention relates to a mobile device, a base structure, a system and a method for recovering 3D parameters of low frequency magnetic field vectors. For example, the system may be a Passive Keyless Entry (PKE) system, the mobile device may be a PKE key device, and the base structure may be a building or a vehicle offering a PKE services.

BACKGROUND TO THE INVENTION

Modern comfort cars, which are currently on the market, may be equipped with a Passive Keyless Entry (PKE) system. In such a PKE system, approaching a car with an associated PKE key is enough to unlock the car, without the need to press a button that may be provided on the key. In PKE systems, the car (as an example of a base structure) incorporates a PKE base structure device, which is operable to act as a transponder and to interrogate the PKE key, which is operable to act as a mobile device (key, or key fob) and which may be associated to the base structure device. In PKE systems, the PKE base structure device uses low frequency radio (LF) electromagnetic fields, with 125 kHz being a typically value of the carrier frequency of the electromagnetic field, for interrogating the mobile device (i.e. the key).

A car incorporating a PKE base station device for providing a PKE service (or PKE functionality) is just one example of a use of a PKE system. Another use of a PKE system may be employed in a building as a PKE base structure device, where access to the building can be gained when approaching a door of the building with an associated door key as the mobile device.

PKE systems can be exploited with a so-called Relay Station Attack (RSA). A RSA simply extends the range of the radio signals that a car (as an example of a PKE base structure device) and its key (as the mobile device) exchange by using a relay device. The final goal of the RSA is to unlock the car with a key that is located out of the car's interrogation range, and to steal the car content and potentially the whole car.

An example embodiment of an RSA is illustrated in FIG. 3. A vehicle or car 112, as an example of a PKE base structure 110, which services PKE, incorporates a PKE base structure device, which comprises at least two base structure antennae 114 and 116. The second base structure antenna 116 is typically arranged in the PKE base structure 110 at a location that is different than the location of the first base structure antenna 114.

A relay system 300, which is operable to make an RSA, may be composed of two nodes 310, 320, i.e. a receiving node 310 and a transmitting node 320. The receiving node 310 comprises a receiving node receiving antenna 312, which simply reads the radio signal (i.e. the low frequency electromagnetic field) next to PKE base structure device 110 (for example the car) within the interrogation range of the PKE base structure device 110, and a receiving node relay antenna 314, which communicates the radio signal to the transmitting node. Both, the receiving node receiving antenna 312 and the receiving node relay antenna 314 may be combined in one single antenna. Correspondingly, in FIG. 3, the receiving node receiving antenna 312 and the receiving node relay antenna 314 are depicted as one single antenna referenced by the numerals 312, 314. The transmitting node 320 comprises a transmitting node relay antenna 322, which receives the radio signal communicated by the receiving node relay antenna 314, and a transmitting node transmitting antenna 324, which transmits the signal as-is to a mobile device (for example the car key 121). The transmission content is generally not sniffed, modified nor forged. Both, the transmission node relay antenna 322 and the transmission node transmitting antenna 324 may be combined in one single antenna. Correspondingly, in FIG. 3, the transmission node relay antenna 322 and the transmission node transmitting antenna 324 are depicted as one single antenna referenced by the numerals 322, 324. A result of the use of the relay system 300 is an extension of the range of the interrogating radio signal between the two devices (i.e. the PKE base structure and the mobile device) in one direction. Also bidirectional relaying may be performed between the PKE base structure device 110 and the mobile device 120.

One specific type of RSA is called unidimensional (1D). In this type of attack the radio signal is measured by the receiving node receiving antenna 312 provided on the receiving node 310 and transmitted by only one antenna, namely the receiving node relay antenna 314, to the transmitting node 320. Therefore, no matter what is the original magnetic field looks like (length, direction and sense of the field vector) at the point, where the receiving node 310 is located, the transmission node transmission antenna 324 will always create a field, which has the same shape (direction and sense of the field vector) and which may be variable only in the field strength (length of the field vector).

The latter characteristics of a 1D RSA, viz. that the relay antenna of the receiving node and the transmitting node antenna of the transmitting antenna each will always create a relay field, which has the same direction and sense of the radio field vector at the point of detection, is clearly illustrated in FIG. 3 by way of the two parallel arrows, which point from left to right starting at the receiving node antenna (the non-referenced left one antenna in FIG. 3) and pointing to the transmitting node antenna (the non-referenced right one antenna in FIG. 3), and by way of the other two parallel arrows, which point from transmitting node antenna to the 3D antenna 122 of the mobile device 120.

By contrast, in the PKE system 100, which is illustrated in FIG. 1 and in which no RSA attack is being performed, the first base structure antenna 114 emits a first radio field (or first electromagnetic field (not referenced in FIG. 1)), a portion of which propagates in the direction towards the mobile device 120, such that it arrives at a 3D antenna 122 of the mobile device 120 with a first angle of arrival and has a first magnetic field vector $H_1$ (not referenced in FIG. 1). The second base structure antenna 116 emits a second radio field (or second electromagnetic field (not referenced in FIG. 1)), a portion of which propagates in the direction towards the mobile device 120, such that it arrives at a 3D antenna 122 of the mobile device 120 with a second angle of arrival and has a second magnetic field vector $H_2$ (not referenced in FIG. 1). The second angle of arrival differs from the first angle of arrival by an angle of arrival difference, which is greater than a definable threshold angle, the size of which depends on the distance between the first and the second base structure antennae 114 and 116 and the interrogation range of the base structure device 110, i.e. the range of the low frequency electromagnetic field as emitted from a base structure antenna 114 or 116, within which range the emitted electromagnetic field can be clearly detected.

Consequent to the angle of arrival difference experienced at the point of the sensing 3D antenna 122 of the mobile device 120 in FIG. 1, the first and the second magnetic field vectors $H_1$ and $H_2$ enclose an angle $\alpha = \angle(H_1, H_2)$, which is greater than a definable threshold angle $\alpha_t$, the size of which also depends on the distance between the first and the second base structure antennae 114 and 116 and the interrogation range of the base structure device 110.

Accordingly, one approach to determining, whether a RSA is being performed, is to measure the first and the second magnetic field vectors $H_1$ and $H_2$, i.e. the lengths, the directions and the senses of the first and the second magnetic field vectors $H_1$ and $H_2$, to determine the angle between the first and the second magnetic field vectors $H_1$ and $H_2$, and to compare the determined angle $\alpha = \angle(H_1, H_2)$ to the defined threshold angle $\alpha_t$. On this basis, it can be determined that a one-dimensional Relay Station Attack (RSA) has occurred, if the determined angle $\alpha$ is equal to or smaller than the threshold angle $\alpha_t$, i.e. $\alpha \leq \alpha_t$. By contrast, it can be determined that a regular wireless connection, without intermediate of a RSA system, has been established between the PKE base structure (110) and the associated mobile device (120), if the determined angle $\alpha$ is greater than the threshold angle $\alpha_t$, i.e. $\alpha > \alpha_t$.

DE 10 2011 079 421 A1 discloses a PKE system and method for authentication of access to a car and/or authentication for starting the car, involving the use of mobile device acting as a mobile identification provider with respect to an associated car. At least two antennae, which are arranged in the car at a mutual distance to each other, transmit independently in time respective electromagnetic signals. The spatial components of the field vectors (and hence the field vectors including the lengths, directions and senses) of the electromagnetic fields emitted from the first and at least a second antennae in the car are measured by the mobile identification provider, wherein the spatial components are defined with respect to a Cartesian coordinate system, which is in a fixed spatial relation (or posture) to the mobile identification provider. Then, the measured spatial components of the two measured field vectors are combined and interrelated, in order to check the degree of parallelism of the two respective field vectors. The mobile identification provider is determined to be recognized properly, if the degree of parallelism is below a predetermined threshold value.

The Applicant of the initial filing of the present patent application is marketing mobile devices for use in PKE systems, which are designed to measure the magnitude of the magnetic field vector, i.e. the length of the field vector, which is sensed locally at the position of the mobile device. These known industry solutions from the Applicant comprise a family of PKE keys, which were not designed for sign detection of the vector components. These PKE keys operate by measuring the X, Y and Z components of the field sequentially with one electronic measurement chain. The resulting value for each component is the maximum magnitude of that component in absolute value, i.e. without the sign of that component. The vectors measured by such a PKE key may be denoted $\vec{m}_1$ and $\vec{m}_2$. They resemble a projection of the real magnetic field vectors $\vec{H}_1$ (herein also designated $H_1$) and $\vec{H}_2$ (herein also designated $H_2$) in the positive octant of the $R^3$ space:

$$\vec{m}_1 = (\max |x_1|, \max |y_1|, \max |z_1|)$$

$$\vec{m}_2 = (\max |x_2|, \max |y_2|, \max |z_2|)$$

A vector measured in a PKE system involving such a PKE key has a known maximum magnitude, which is the amplitude of the magnetic field, but an unknown direction and sense. By not knowing the real directions of the measured vectors $\vec{m}_1$ and $\vec{m}_2$ with such a PKE mobile device, such as the known industry solutions from the Applicant comprising a family of PKE keys, which were not designed for sign detection of the vector components, it is not possible to measure the real angle $\alpha$ between the real magnetic fields $\vec{H}_1$ and $\vec{H}_2$. Hence, such PKE mobile devices, as marketed hitherto, cannot be used to discriminate and/or recognize a 1D RSA, and cannot be used as a 1D RSA countermeasure.

SUMMARY OF THE INVENTION

It is an object of the present invention to provide a mobile device (for example PKE key), an evaluation device, a PKE base structure (for example a PKE servicing vehicle), to which the mobile device may be associated, a PKE system and a method for determining the 3D field parameters of a magnetic field vectors, in which device, structure, system and method only magnitudes of the 1D components, i.e. one or more of an X-, a Y-, and a Z-component, of the magnetic field vector can be measured, determined and/or provided, wherein the 3D field parameters include, in addition to the X-, Y-, and Z-components, the direction of the magnetic field vector. It is a particular object of the present invention that device, structure, system can be used as a 1D RSA countermeasure.

This object is solved by the subjects having the features according to the independent patent claims. Further embodiment examples are shown in the dependent claims.

According to an exemplary embodiment example of the present invention, there is established a mobile device, for example a mobile Passive Keyless Entry (PKE) key device, for determining 3D field values of a magnetic field, and for use in a PKE system. When used in a PKE system, the PKE system may comprise, in addition to the mobile device, a PKE base structure, with which the mobile device is in co-operation with, and to which preferably the mobile device is associated. The PKE base structure has at least a first base structure antenna, which is operable to emit an electromagnetic field, in particular a low frequency electromagnetic filed. The mobile device has a 3D antenna having a first, second, and third coil antenna, and a signal processing chain. The 3D antenna is operable to sense a local magnetic field vector $H=(x, y, z)$, which is present locally at the position of the 3D antenna, of the electromagnetic field and which has been emitted from the first base structure antenna. The three coil antennas (124, 126, 128) of the 3D antenna are arranged mutually perpendicular to each other. Each coil antenna points in a direction of one of the axes of a right-handed Cartesian coordinate system having an X-axis, a Y-axis, and a Z-axis.

In this exemplary embodiment example of the present invention, the first coil antenna is associated with the X-axis and is operable to sense the X-component x of the local magnetic field vector H, and to output a first low frequency signal $u_x$ indicative of the X-component x of the magnetic field vector H. The second coil antenna is associated with the Y-axis and is operable to sense the Y-component y of the local magnetic field vector H, and to output a second low frequency signal $u_y$ indicative of the Y-component y of the magnetic field vector H. The third coil antenna is associated with the Z-axis and is operable to sense the Z-component z of the local magnetic field vector H, and to output a third low frequency signal $u_z$ indicative of the Z-component z of the magnetic field vector H. The 3D antenna is further operable to measure a magnitude |S| of the sum |S|=|x+y+z| of the sum of the X-component x, the Y-component y, and the Z-component z of the local magnetic field vector H, and to output a sum signal $u_S$ indicative of the sum |S|.

In this exemplary embodiment example of the present invention, the signal processing chain is operable to provide, in particular sequentially, on the basis of the first, second and third low frequency signals $u_x$, $u_y$, and $u_z$ output from the first, second and third coil antenna and on the basis of the sum signal $u_S$, respectively, the following 3D field values relating to the magnetic field vector H: a first value $v_x$ indicative of the local magnitude |x| of the X-component x of the magnetic field vector H based on the output first low frequency signal $u_x$, a second value $v_y$ indicative of the local magnitude |y| of the Y-component y of the magnetic field vector H based on the output first low frequency signal $u_y$, a third value $v_z$ indicative of the local magnitude |z| of the Z-component z of the magnetic field vector H based on the output first low frequency signal $u_z$, and further a sum value $v_S$ indicative of the local magnitude of |S|=|x+y+z| of the sum of the X-component x, the Y-component y, and the Z-component z of the magnetic field vector H based on the output sum signal $u_S$.

According to an exemplary embodiment example, the mobile device may be a mobile Passive Keyless Entry (PKE) key device. The PKE key device may be a key for a vehicle which is operable to provide a PKE service (i.e. a PKE car key), or may be a key for a door of building, which is equipped with a locking system that is operable to provide a PKE service (i.e. a PKE door key).

According to a first exemplary embodiment example, the signal processing chain of the mobile device has: a summing circuit; a first antenna switch, which is electrically connected serially to the first coil antenna and between the first coil antenna and the summing circuit; a second antenna switch, which is electrically connected serially to the second coil antenna and between the second coil antenna and the summing circuit; a third antenna switch, which is electrically connected serially to the third coil antenna and between the third coil antenna and the summing circuit, wherein the first, second and third coil antennae are electrically connected in parallel to each other. Furthermore, in the first exemplary embodiment example, the summing circuit is operable to sum, as a function of the temporary opening or closing states of the first, second, and third antenna switches, the first low frequency signal $u_x$ output from the first coil antenna, the second low frequency signal $u_y$ output from the second coil antenna, the third low frequency signal $u_z$ output from the third coil antenna and/or the sum signal $u_S$ indicative of the sum |S|.

According to a second exemplary embodiment example, which may be alternative to the first embodiment example, wherein signal processing chain has: an input node; a first antenna switch, which is electrically connected in parallel to the first coil antenna; a second antenna switch, which is electrically connected in parallel to the second coil antenna; a third antenna switch, which is electrically connected in parallel to the third coil antenna. Furthermore, the first, second and third coil antennae are electrically connected serially in a series, and the first antenna switch, the second antenna switch, and the third antenna switch are connected serially in a series. The input node is operable to receive, as a function of the temporary opening or closing states of the first, second, and third antenna switches, the first low frequency signal $u_x$ output from the first coil antenna, the second low frequency signal $u_y$ output from the second coil antenna, the third low frequency signal $u_z$ output from the third coil antenna and/or the sum signal $u_S$ indicative of the sum |S|.

In a context to an exemplary embodiment example of the mobile device, the PKE base structure further has a second base structure antenna, which is arranged at a location of the PKE base structure that is different to the location of the first base structure antenna, and which is operable to emit a, particularly low frequency, electromagnetic field. The first base structure antenna is operable to emit a first electromagnetic field, and the second base structure antennae is operable to emit a second electromagnetic field. In this exemplary embodiment example of the mobile device, the signal processing chain is operable to determine, particularly sequentially, the 3D field values, which relate to a first magnetic field vector $H_1$, present locally at the position of the 3D antenna, of the low frequency electromagnetic field emitted from the first base structure antenna, and which comprise the following: the first value $v_{x,1}$, the second value $v_{y,1}$, the third value $v_{z,1}$, and the sum value $v_{S1}$ relating to the first magnetic field vector $H_1$.

In this exemplary embodiment example, the signal processing chain may further be operable to determine, particularly sequentially, the 3D field values, which relate to a second magnetic field vector $H_2$, present locally at the position of the 3D antenna, of the low frequency electromagnetic field emitted from the second base structure antenna, and which comprise the following: the first value $v_{x,2}$, the second value $v_{y,2}$, the third value $v_{z,2}$, and the sum value $v_{S,2}$ relating to the second magnetic field vector $H_2$.

In an exemplary embodiment example of the mobile device, the signal processing chain is operable to determine the 3D field values sequentially.

In an exemplary embodiment example of the mobile device, the mobile device has a storage device, which is operable to store at least the 3D field values relating to the first magnetic field vector $H_1$, namely: the first value $v_{x,1}$, the second value $v_{y,1}$, the third value $v_{z,1}$, and the sum value $v_{S1}$. Preferably. the storage device is further operable to store the 3D field values relating to the second magnetic field vector $H_2$, namely: the first value $v_{x,2}$, the second value $v_{y,2}$, the third value $v_{z,2}$, and the sum value $v_{S2}$.

According to an exemplary embodiment example of the present invention, there is established an evaluation device, for use in a PKE system having a mobile device, in particular a mobile Passive Keyless Entry, PKE, key device, for determining 3D field values of a magnetic field vector H, and a PKE base structure, to which the mobile device may be associated and which comprises at least a first base structure antennae, which is operable to emit a, particularly low frequency, electromagnetic field. The evaluation device is operable to: a) receive a first value $v_x$ indicative of the local X-component x of the magnetic field vector H; b) receive a second value $v_y$ indicative of the local Y-component y of the magnetic field vector H; c) receive a third value $v_z$ indicative of the local Z-component z of the magnetic field vector H; d) receive a sum value $v_S$ indicative of the local magnitude of $|S|=|x+y+z|$ of the sum of the X-component x, the Y-component y, and the Z-component z of the magnetic field vector H; and e) calculate the following set of candidates $\{C_i | i \in \{1, 2, 3, 4\}\}$ of sum values—relating to the magnetic field vector H:

$|C_1| = |+|v_{x,1}|+|v_{y,1}|+|v_{z,1}||$, $|C_2| = |+|v_{x,1}|+|v_{y,1}|-|v_{z,1}||$, $|C_3| = |+|v_{x,1}|-|v_{y,1}|+|v_{z,1}||$, and $|C_4| = |-|v_{x,1}|+|v_{y,1}|+|v_{z,1}||$, wherein each one of the set of candidates $\{C_{i,1} \in \{1, 2, 3, 4\}\}$ is associated with a particular one of the set of sign combinations $\{(sign\_x_i, sign\_y_i, sign\_z_i) | i \in \{1, 2, 3, 4\}$ of the following set of sign combinations:

$(sign\_x_1, sign\_y_1, sign\_z_1) = (+,+,+)$, $(sign\_x_2, sign\_y_2, sign\_z_2) = (+,+,-)$, $(sign\_x_3, sign\_y_3, sign\_z_3) = (+,-,+)$, $(sign\_x_4, sign\_y_4, sign\_z_4) = (-,+,+)$.

In an exemplary embodiment example of the evaluation device, the evaluation device is further operable to f) determine that one of the candidates $\{C_{i,1} | i \in \{1, 2, 3, 4\}\}$ of sum values out of the set $\{|C_{i,1}|, |C_{2,1}|, |C_{3,1}|, |C_{4,1}|\}$, which is closest to the sum value $|v_S|$ relating to the magnetic field vector H of the electromagnetic field; g) apply that one of the sign combinations associated with the one candidate sum value, which in step f) yielded the smallest distance to the sum value $|v_S|$, to the set, which includes the magnitudes $|v_x|$, $|v_y|$, and $|v_z|$ of the first value, the second value, and the third value, respectively, so as to yield a vector $V = \pm (sign_i\_x \cdot v_x, sign\_y_i \cdot v_y, sign\_z_i \cdot v_z)$; and h) provide the vector V yielded in result of the operability f) as a vector, which has the direction of the magnetic field vector H.

In a context for an exemplary embodiment example of the evaluation device, the PKE base structure further has a second base structure antennae, which is arranged at a location of the PKE base structure that is different from the location of the first base structure antenna, and which is operable to emit a, particularly low frequency, electromagnetic field, wherein the first and the second base structure antennae are operable to emit, respectively, a first and a second electromagnetic field. In this exemplary embodiment example, the evaluation device is further operable to i) perform the respective steps a) to h), which receive the 3D field values relating to a first magnetic field vector $H_1$ of the magnetic field emitted from a first base structure antenna (114) and provide the vector $V_i$ having the direction of the magnetic field vector $H_1$, using the 3D field quantities relating to the second magnetic field vector $H_2$ of the magnetic field emitted from the second base structure antenna (116), so as to yield a second vector $V_2$, which has the direction of the magnetic field vector $H_2$; j) determine the angle α between the first vector $V_1$ and the second vector $V_2$; k) compare the determined angle α with a small threshold angle $α_t$; and l) determine that a one-dimensional Relay Station Attack (RSA) has occurred, if the determined angle α is equal to or smaller than the threshold angle $α_t$, i.e. $α \le α_t$.

For example, in step k), the utilized threshold angle $α_t$ is 6°, preferably 5°, more preferably 4°, more preferably 3°, still more preferably 2°, and still more preferably 1°. In respect of a suitable selection of the threshold angle $α_t$, the following considerations apply. A relatively high threshold angle may yield too many false positives (i.e. an attack detected when there is in fact none), while a relatively low threshold angle may yield too many false negatives (i.e. no attack detected when there is in fact an attack occurring). Thus, a selection of a preferred value of the threshold angle is a matter of the particular PKE system implementation. In particular, a selection of a suitable threshold angle value depends on the accuracy of the field component measurements. Usually, threshold angle values of around 5° are used. However, in view of the afore-mentioned considerations, this may not always be a suitable selection.

In this exemplary embodiment example, the evaluation device may further be operable to: m) preferably determine that a regular wireless connection has been established between the PKE base structure (110) and the associated mobile device (120), if the determined angle α is greater than the threshold angle $α_t$, i.e. $α > α_t$.

In an exemplary embodiment example of the evaluation device, the evaluation device is arranged in the mobile device.

Alternative to this, in an exemplary embodiment example of the evaluation device, the evaluation device is arranged in the PKE base structure.

According to an exemplary embodiment example of the present invention, there is established a Passive Keyless Entry (PKE) system having: a PKE base structure, in particular one of a building and a vehicle, which comprises at least a first and a second base structure antenna, which are arranged at different locations of the PKE base structure and are each operable to emit a low frequency electromagnetic field; and a mobile device, in particular a mobile Passive Keyless Entry, PKE, key device, as described above; and an evaluation device as described above and being arranged in the mobile device. Herein, preferably, the mobile device is associated to the PKE base structure. The PKE base structure may in particular be one of a building and a vehicle.

According to an exemplary embodiment example of the present invention, there is established a Passive Keyless Entry (PKE) system having: a PKE base structure, in particular one of a building and a vehicle, which comprises at least a first and a second base structure antenna, which are arranged at different locations of the PKE base structure and are each operable to emit a low frequency electromagnetic field; a mobile device, in particular a mobile Passive Keyless Entry, PKE, key device, as described above; and an evaluation device as described above and being arranged in the PKE base structure. Also herein, preferably the mobile device is associated to the PKE base structure.

According to an exemplary embodiment example of the present invention, there is established a first method for determining 3D field values relating to a magnetic field vector $H=(x, y, z)$ present locally at the position of a 3D antenna of a mobile device, the field vector H being due to a low frequency electromagnetic field emitted from one of the first and second base structure antennae of a Passive Keyless Entry (PKE) base structure. Herein, the mobile device may in particular be a mobile PKE key device and is preferably associated to the PKE base structure. The 3D antenna has three coil antennas, which are arranged mutually perpendicular to each other, wherein each coil antenna points in a direction of one of the axes of a right-handed Cartesian coordinate system having an X-axis, a Y-axis, and a Z-axis. The method comprises the following steps: providing a first value $v_x$ indicative of the local X-component x of the magnetic field vector H; providing a second value $v_y$ indicative of the local Y-component y of the magnetic field vector H; providing a third value $v_z$ indicative of the local Z-component z of the magnetic field vector H, and providing a sum value $v_S$ indicative of the sum $|S|=|x+y+z|$ of the local X-component x, local Y-component y, and local Z-component z of the magnetic field vector H.

In an exemplary embodiment example of the first method, providing the first value $v_x$ comprises measuring the X-component x of the local magnetic field vector H using the first coil antenna, which is associated with the X-axis, and outputting a first low frequency signal $u_x$ indicative of the X-component x of the magnetic field vector H, and providing the first value $v_x$, as an output of the signal processing chain, on the basis of the first low frequency signal $u_x$ output from the first coil antenna.

In an exemplary embodiment example of the first method, providing the second value $v_y$ comprises measuring the Y-component y of the local magnetic field vector H using the second coil antenna, which is associated with the Y-axis, and outputting a second low frequency signal $u_y$ indicative of the Y-component y of the magnetic field vector H, and providing the second value $v_y$, as an output of the signal processing chain, on the basis of the second low frequency signal $u_y$ output from the second coil antenna.

In an exemplary embodiment example of the first method, providing the third value $v_z$ comprises measuring the Z-component z of the local magnetic field vector H using the third coil antenna which is associated with the Z-axis, and outputting a third low frequency signal $u_z$ indicative of the Z-component z of the magnetic field vector H, and providing the third value $v_z$, as an output of the signal processing chain, on the basis of the third low frequency signal $u_z$ output from the third coil antenna.

In an exemplary embodiment example of the first method, providing the sum value $v_S$ comprises measuring the magnitude $|S|$ of the sum $|S|=|x+y+z|$ of the sum of the X-, the Y-, and the Z-component of the local magnetic field vector H, using the 3D antenna, and outputting a sum signal $u_S$ indicative of the sum $|S|$.

According to an exemplary embodiment example of the present invention, there is established a second method for determining the direction of a magnetic field vector H of a, particularly low frequency, magnetic field $H=(x, y, z)$, which is present locally at a position of a 3D antenna (for example of a mobile device, such as a mobile Passive Keyless Entry System, PKE, key device) of a (particularly low frequency) electromagnetic field emitted from an antenna (for example a base structure antenna of a PKE base structure). The method has the following steps:

a) receiving a first value $v_x$ indicative of the local X-component x of a magnetic field vector H;
b) receiving a second value $v_y$ indicative of the local Y-component y of the magnetic field vector H;
c) receiving a third value $v_z$ indicative of the local Z-component z of the magnetic field vector H;
d) receiving a sum value $v_S$ indicative of the local magnitude of $|S=|x+y+z|$ of the sum of the X-component x, the Y-component y, and the Z-component z of the magnetic field vector H;
e) calculating the following set of candidates $\{C_i | i \in \{1, 2, 3, 4\}\}$ of sum values—relating to the magnetic field vector H:

$|C_1|=|+|v_{x,1}|+|v_{y,1}|+|v_{z,1}||$, $|C_2|=|+|v_{x,1}|+|v_{y,1}|-|v_{z,1}||$, $|C_3|=|+|v_{x,1}|-|v_{y,1}|+|v_{z,1}||$, and $|C_4|=|-|v_{x,1}|+|v_{y,1}|+|v_{z,1}||$, wherein each one of the set of candidates $\{C_{i,1} | i \in \{1, 2, 3, 4\}\}$ is associated with a particular one of the set of sign combinations $\{(\text{sign}\_x_i, \text{sign}\_y_i, \text{sign}\_z_i) | i \in \{1, 2, 3, 4\}\}$ of the following set of sign combinations:

$(\text{sign}\_x_1, \text{sign}\_y_1, \text{sign}\_z_1) = (+,+,+)$, $(\text{sign}\_x_2, \text{sign}\_y_2, \text{sign}\_z_2) = (+,+,-)$, $(\text{sign}\_x_3, \text{sign}\_y_3, \text{sign}\_z_3) = (+,-,+)$, $(\text{sign}\_x_4, \text{sign}\_y_4, \text{sign}\_z_4) = (-,+,+)$;

f) determining that one of the candidates $\{C_{i,1} | i \in \{1, 2, 3, 4\}\}$ of sum values out of the set $\{|C_{i,1}|, |C_{2,1}|, |C_{3,1}|, |C_{4,1}|\}$, which is closest to the sum value $|v_S|$ relating to the magnetic field vector H of the electromagnetic field;
g) applying that one of the sign combinations associated with the one candidate sum value, which in step f) yielded the smallest distance to the sum value $|v_S|$, to the set, which includes the magnitudes $|v_x|$, $|v_y|$, and $|v_z|$ of the first value, the second value, and the third value, respectively, so as to yield a vector $V = \pm (\text{sign}_i\_x \cdot v_x, \text{sign}\_y_i \cdot v_y, \text{sign}\_z_i \cdot v_z)$, and
h) providing the vector V yielded in step f) as a vector, which has the direction of the magnetic field vector H.

In an exemplary embodiment example, the second method further has the following steps:
i) performing the respective steps a) to h), which receive the 3D field values relating to a first magnetic field vector $H_1$ of the magnetic field emitted from a first base structure antenna and provide the vector $V_1$ having the direction of the magnetic field vector $H_1$, using the 3D field quantities relating to the second magnetic field vector $H_2$ of the magnetic field emitted from the second base structure antenna, so as to yield a second vector $V_2$, which has the direction of the magnetic field vector $H_2$;
j) determining the angle α between the first vector $V_1$ and the second vector $V_2$;
k) comparing the determined angle α with a small threshold angle $α_t$, wherein for example the threshold angle $α_t$ is 5°, preferably 4°, more preferably 3°, still more preferably 2°, and still more preferably 1°; and
l) determining that a one-dimensional Relay Station Attack has occurred, if the determined angle α is equal to or smaller than the threshold angle $α_t$, i.e. $α \leq α_t$.

In an exemplary embodiment example, the second method further has the following step: m) preferably determining that a regular wireless connection has been established between the PKE base structure and the associated mobile device, if the determined angle α is greater than the threshold angle $α_t$, i.e. $α > α_t$.

According to an exemplary embodiment example of the present invention, there is established a computer-readable storage medium storing a computer program for controlling or executing the first method as described above, when run on a data processing system, such as a processor, a microprocessor, or a computer.

According to an exemplary embodiment example of the present invention, there is established a computer-readable storage medium storing a computer program for controlling or executing the second method as described above, when run on a data processing system, such as a processor, a micro-processor, or a computer.

BRIEF DESCRIPTION OF THE DRAWINGS

In the following, exemplary embodiment examples of the present invention are described in detail with reference to the following figures.

FIG. 5B shows a schematic block diagram of a 3D antenna co-operating with a signal processing chain comprising a first embodiment example of a switching network, in a mobile device, such as Passive Keyless Entry key device, according to an embodiment example of the invention, wherein the switching network is in a second switching state.

FIG. 5C shows a schematic block diagram of a 3D antenna co-operating with a signal processing chain comprising a first embodiment example of a switching network, in a mobile device, such as Passive Keyless Entry key device, according to an embodiment example of the invention, wherein the switching network is in a third switching state.

FIG. 7 shows a schematic block diagram of a method for operating a switching network according to the invention, in a mobile device, such as Passive Keyless Entry key device, according to an embodiment example of the invention.

Similar or like components in different figures are provided with the same reference numerals.

DETAILED DESCRIPTION OF PREFERRED EMBODIMENTS

Before exemplary embodiment examples of the invention are described with reference to the figures, some general aspects of the invention as proposed by the present inventors shall still be explained.

Figure 1:
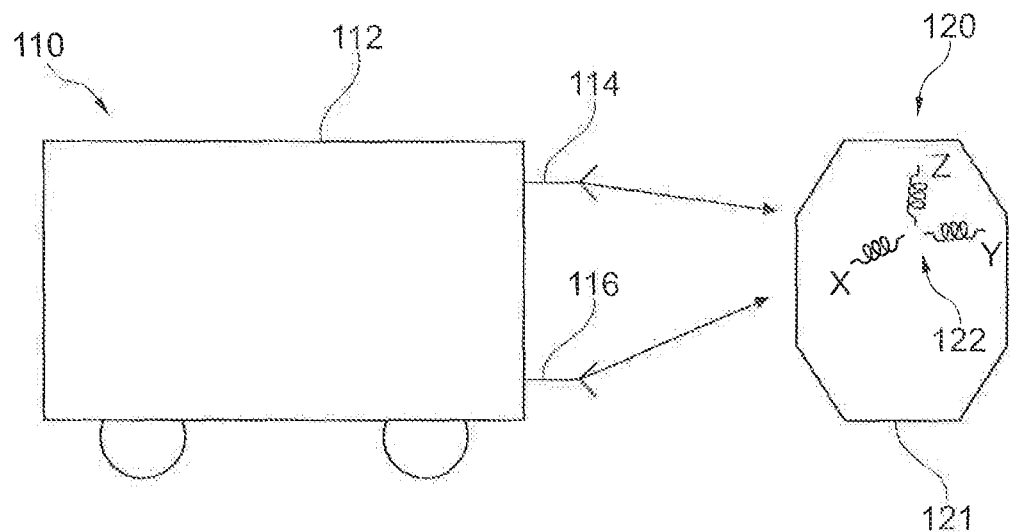
FIG. 1 shows a schematic block diagram of a Passive Keyless Entry system according to an embodiment example of the invention, wherein an authenticated mobile device is co-operating with the system.

A simple defense against a 1D RSA is to measure the angle between multiple fields. The key (e.g. a car key) is usually equipped with a 3D LF receiving antenna with 3 coils oriented as in a right-handed 3D reference system (X, Y, Z) as it must receive in every possible orientation. Supposing that the key does not move or moves for a small enough distance during the whole process, the car activates two different low frequency (LF) antennas on its body in sequence, which shall be referenced first PKE base structure antenna 114 and second PKE base structure antenna 116, which generate two different fields $\vec{H_1}$ and $\vec{H_2}$. In any point around the car (as an example of a PKE base structure device 110), the key (as an example of a mobile device 120) would measure a vector $\vec{H_1}=(x_1,y_1,z_1)$ composed of the X, Y, and Z voltages (which may be RSSI values or magnetic field units) obtained from each coil of its 3D antenna 122 and then $\vec{H_2}=(x_2,y_2,z_2)$, as illustrated in the setting of FIG. 1. The angle α between $\vec{H_1}$ (herein also designated $H_1$) and $\vec{H_2}$ (herein also designated $H_2$) could be computed with the following formula obtained by reversing the geometrical definition of the scalar product (or dot product):

$$\alpha = \arccos\left(\frac{\vec{H_1} \cdot \vec{H_2}}{\|\vec{H_1}\|\|\vec{H_2}\|}\right) \qquad \text{(Eq. 1)}$$

Figure 3:
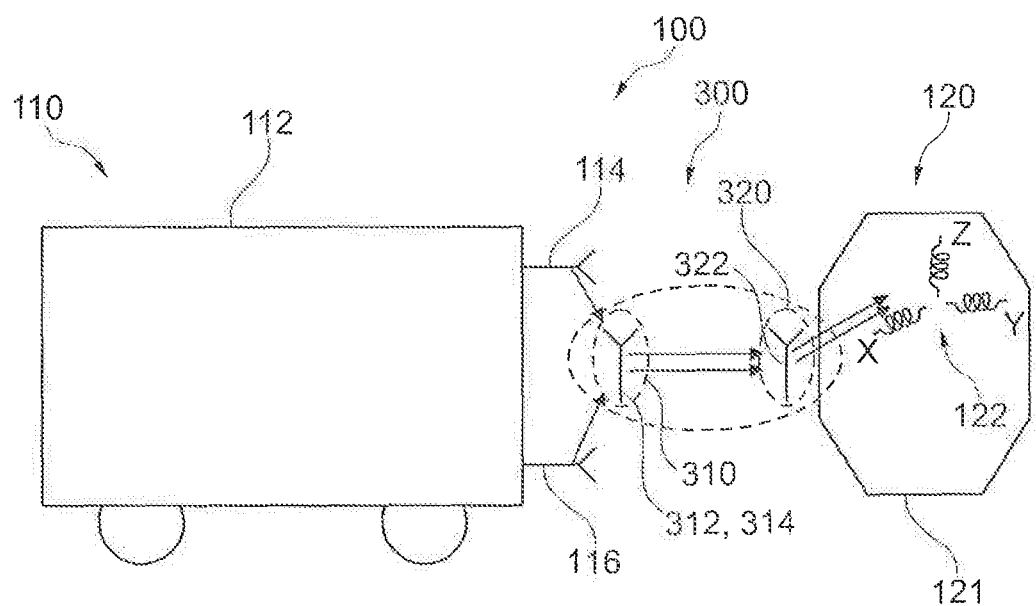
FIG. 3 shows a schematic block diagram of a Passive Keyless Entry system according to an embodiment example of the invention, wherein a one-dimensional Relay Station Attack is attempted on the system.

When the magnetic fields $\vec{H_1}$ (or $H_1$) and $\vec{H_2}$ (or $H_2$) are relayed by a 1D RSA system, such as the relay system 300 shown in FIG. 3, the relayed fields $\vec{R_1}$ and $\vec{R_2}$ will have the same shape and the measured vectors of the relayed fields will match in direction and sense, as is shown in FIG. 3. Consequently, the angle between $\vec{R_1}$ and $\vec{R_2}$ will be zero (in theory). In practice, we will measure a very small angle instead, so we define a small angle $\alpha_t$ as a threshold and we compare the measured angle α to it. If $\alpha \leq \alpha_t$, then the PKE system detects a 1D RSA and prevents the car from unlocking and/or starting.

The invention proposes a hardware and firmware modification of a mobile device 120, such as a PKE car key, with vector components sign losses (like in the known industry solution from the Applicant comprising a family of PKE keys as mentioned in the background section) for reconstructing the real direction of the measured vectors $\vec{m_1}$ and $\vec{m_2}$, thus allowing an easy computation of the angle α between them.

The hardware modification consists in measuring voltages on the three (3) coil antennae (viz. the first, second and third coil antenna 124, 126, 128) of the 3D antenna 122 e.g. sequentially, that is one at the time, as performed before, and then also the sum of the voltages on the three coil antennae 124, 126 and 128.

The software modification consists in applying each one of the possible sign combination sign combinations $\{(\text{sign}\_x_i, \text{sign}\_y_i, \text{sign}\_z_i) | i \in \{1, 2, 3, 4\}\}$ to the vector components to see if their sum matches the real measured sum in magnitude. The matching one is the real sign combination.

As before, the PKE key (as an embodiment of a mobile device 120) is equipped with a 3D antenna 122 having three (3) coils 124, 126, 128 oriented, respectively along the X-, Y- and Z-axes of a right-hand Cartesian coordinated system that is in fixed spatial relation (or posture) to the PKE key type mobile device 120. Each one of the coils 124, 126, 128 has also a proper impedance in parallel (in particular a capacitor, such as the antenna capacitors 124C, 126C, 128C, and a resistor, such as the antenna resistors 124R, 126R, 128R) to make the coil antennas 124, 126, 128 resonant on the desired frequency, i.e. the low frequency (LF) of the interrogating electromagnetic field emitted from the first and second base structure antennae 114, 116. The tensions on each antenna coil 124C, 126C, 128C are measured in sequence (first antenna coil 124L, second antenna coil 126L and then third antenna coil 128L) as the signal processing chain 150 is switching the connection from one coil to the other.

A measurement performed with such hardware provides the maximum magnitudes of the X-, Y-, and Z-components of the magnetic field vectors $\vec{H_1'}$ (or $H_1$) and $\vec{H_2'}$ (or $H_2$) only.

According to the proposed hardware modification, a virtual fourth coil (not referenced and not shown) should be implemented. The voltages (or tensions) on the existing and resonant X-, Y- and Z-coils (viz. the first antenna coil 124L, the second antenna coil 126L, and the third the antenna coil 128L) are summed up for example with an operational amplifier 152. The resulting signal is then further passed through a signal processing chain 150 of the mobile device 120 as if it were a normal coil, such as the first, second and third coil antenna 124, 126 and 128. A key observation according to the invention is that only one signal processing chain 150 is required and it is used sequentially on all the 3+1 coils (i.e. the first, second and third coil antenna 124, 126, 128 plus the virtual fourth antenna) of the 3D antenna 122, without the need of having multiple chains running in parallel, thus reducing the current consumption and the cost of the components.

Virtually the resulting signal is the same one would get out of the 3 coils connected in series with the whole series properly tuned to the resonance frequency. The advantage with the operation amplifier summing is the reduced need of switching both for connecting the coils in series and adapting the capacitance to the summed impedance. The reduced number of switches also reduces parasitic capacities.

According to the proposed hardware modification, the software of the measurement device 130 should perform the measure of the virtual fourth coil after measuring the first, second and third coils 124, 126, 128 (or X-, Y- and Z,coils) normally. After the measurement is completed, there have become available four (4) values in the storage 160 of the measurement device 130: $|x|, |y|, |z|, |s|=|x+y+z|$ being respectively the magnitude of the signal on the first, second and third coils 124, 126, 128 (viz. the X-, Y- and Z-coils) and the magnitude of the virtual fourth (sum) coil. Note that the sum value $|s|$ is obtained by summing the signals output from the first, second and third coils 124, 126, 128 (viz. the X-, Y- and Z-coils) with their signs, while when measured on their own, the first, second and third coils 124, 126, 128 (viz. the X-, Y- and Z-coils) give only the magnitude information.

The following is noted: The physical quantity, which the $|x|, |y|, |z|, |s|$ values represent, is not relevant for this algorithm as long as it is the same for all of these values. For example, it may be the tension on the coils 124, 126, 128, the output value of an analog-digital converter 156, an RSSI value or a magnetic field strength output from a conventional RSSI measurement chain as an example embodiment of a signal processing chain 150.

It has been mentioned above in the introductory portion, that a known industry solution from the Applicant comprising a family of PKE keys, which were not designed for sign detection of the vector components (as has been mentioned above in the background section), operate by measuring the X-, Y- and Z-components of the magnetic field sequentially with one electronic signal processing chain. The resulting value for each component is the maximum magnitude of that component in absolute value, i.e. without the sign of that component. The vectors measured by such a PKE key may be denoted $\vec{m_1}$ and $\vec{m_2}$. They resemble a projection of the real magnetic field vectors $\vec{H_1'}$ and $\vec{H_2'}$ in the positive octant of the $R^3$ space:

$$\vec{m_1} = (\max |x_1|, \max |y_1|, \max |z_1|)$$

$$\vec{m_2} = (\max |x_2|, \max |y_2|, \max |z_2|)$$

A vector measured in a PKE system involving such a PKE key has a known maximum magnitude, which is the amplitude of the magnetic field, but an unknown direction and sense. The signs of each component are unknown. Each component has 2 possible signs, there are 3 components, which gives $2^3=8$ component signs combinations per vector.

(+++), (++−), (+−+), (−++),
(−−−),(−−+),(−+−),(+−−)

By not knowing the real directions of the measured vectors $\vec{m_1}$ and $\vec{m_2}$ with such PKE mobile devices, like the known industry solutions from the Applicant comprising a family of PKE keys, which were designed to measure the magnitudes of the magnetic field components (as mentioned above in the background section), it is not possible to measure the real angle α between the real magnetic fields $\vec{H_1'}$ and $\vec{H_2'}$. Hence, PKE mobile devices, such as the known industry solutions from the Applicant as marketed hitherto, which were designed to measure the magnitudes of the magnetic field components, cannot be used to discriminate and/or recognize a 1D RSA, and cannot be used as a 1D RSA countermeasure.

According to the present invention, the algorithm of the modified software according to the invention has now to iterate over the sign combinations mentioned above. Each sign combination is applied to the $|x|, |y|, |z|$ values. They are then summed up. The absolute value of the resulting sum is taken as a candidate coil sum. Due to this last absolute value, only four (4) sign combinations of the eight (8) possibly sign combinations need to be considered, because the results would be redundant otherwise.

$$|s_1| = |+|x|+|y|+|z||$$

$$|s_2| = |+|x|+|y|-|z||$$

$$|s_3| = |+|x|-|y|+|z||$$

$$|s_4| = |-|x|+|y|+|z||$$

In an ideal scenario, one of these candidate coil sums $|s_1|$, $|s_2|$, $|s_3|$, $|s_4|$ would match the value measured with the virtual fourth coil $|s|$. The signs used for that candidate are the one to apply on the $|x|$, $|y|$, $|z|$ values to obtain the direction of the measured field vector.

As with every measured value, various measurement errors or rounding errors will make it differ so the equality will never take place. In that case, it is enough to measure the distance between the sum value $|s|$ and each candidate: $||s|-|s_i||$, $i \in \{1,2,3,4\}$. The signs used for that candidate, which has the smallest distance to the sum value $|s|$, are the ones (i.e. the signs) to apply on the $|x|$, $|y|$, $|z|$ values, in order to obtain the direction of the measured field vector.

Further considerations comprise the following.

The result of this algorithm is a sign for each X-, Y-, and Z-component of the field vector H that is being measured. Technically there are two solutions: one being the one obtained and the other its exact opposite (invert the sign per each coordinate). There is no correct choice between the two unless a specific moment in time is taken as reference to measure the sign, which may be given by the information carried in the signal. For the purposes of this invention, there is no need to choose one of the two solutions as they carry the same information: the direction of the vector, not its sense. Any vector $\vec{v}$ lays on a line obtained by connecting the origin to $\vec{v}$. When examining $-\vec{v}$, the line is the same. Knowing the line (without the sense) of two measured vectors is enough to compute the angle between them, because this angle is by definition the smallest one between the two lines.

The signal processing chain 150 must be calibrated to output the same result when the same field is passing through coils of different size. If that is not the case, the algorithm is not guaranteed to work.

As an impact of the present invention, in other words as a consequence of the invention, PKE keys, such as the known industry solutions from the Applicant, which were not designed for sign detection of the vector components, may be modified with simple hardware and software changes to became operable to detect also the vector signs and the vector directions.

The directions may be used for an angle-based countermeasure against 1D RSA, because as real angles between multiple vectors are measured, but at least a real angle between two magnetic vectors $H_1$ and $H_2$.

FIG. 1 shows a schematic block diagram of a Passive Keyless Entry (PKE) system 100 according to an embodiment example of the invention, wherein an authenticated mobile device 120 is co-operating with the PKE base structure device 110.

A PKE system 100 according to the invention has a PKE base structure 110, which may be one of a building and a vehicle, which comprises at least a first and a second base structure antenna 114, 116. The first and a second base structure antenna 114, 116 are arranged at different locations of the PKE base structure 110 and are each operable to emit an electromagnetic field, embodied as a low frequency (LF) electromagnetic field. The PKE system 100 further has a mobile device 120, in particular a mobile PKE key device 121.

The mobile device 120 incorporates a 3D antenna 122, which is operable to sense a local magnetic field vector H=(x, y, z) of the electromagnetic field that is present locally at the position of the 3D antenna 122 and has been emitted from the first base structure antenna 114. The 3D antenna 122 has three coil antennas 124, 126, 128, which are arranged mutually perpendicular to each other, wherein each coil antenna 124, 126, 128 points in a direction of one of the axes of a right-handed Cartesian coordinate system having an X-axis, a Y-axis, and a Z-axis.

The first coil antenna 124 is associated with the X-axis and is operable to sense the X-component x of the local magnetic field vector H, and to output a first low frequency signal $u_x$ indicative of the X-component x of the magnetic field vector H. The second coil antenna 126 is associated with the Y-axis and is operable to sense the Y-component y of the local magnetic field vector H, and to output a second low frequency signal $u_y$ indicative of the Y-component y of the magnetic field vector H. The third coil antenna 128 is associated with the Z-axis and is operable to sense the Z-component z of the local magnetic field vector H, and to output a third low frequency signal $u_z$ indicative of the Z-component z of the magnetic field vector H. The 3D antenna 122 further is operable as the above-mentioned fourth virtual coil, that is it is the 3D antenna 122 is operable to measure a magnitude $|S|$ of the sum $|S|=|x+y+z|$ of the sum of the X-component x, the Y-component y, and the Z-component z of the local magnetic field vector H, and to output a sum signal $u_S$ indicative of the sum $|S|$.

Figure 2A:
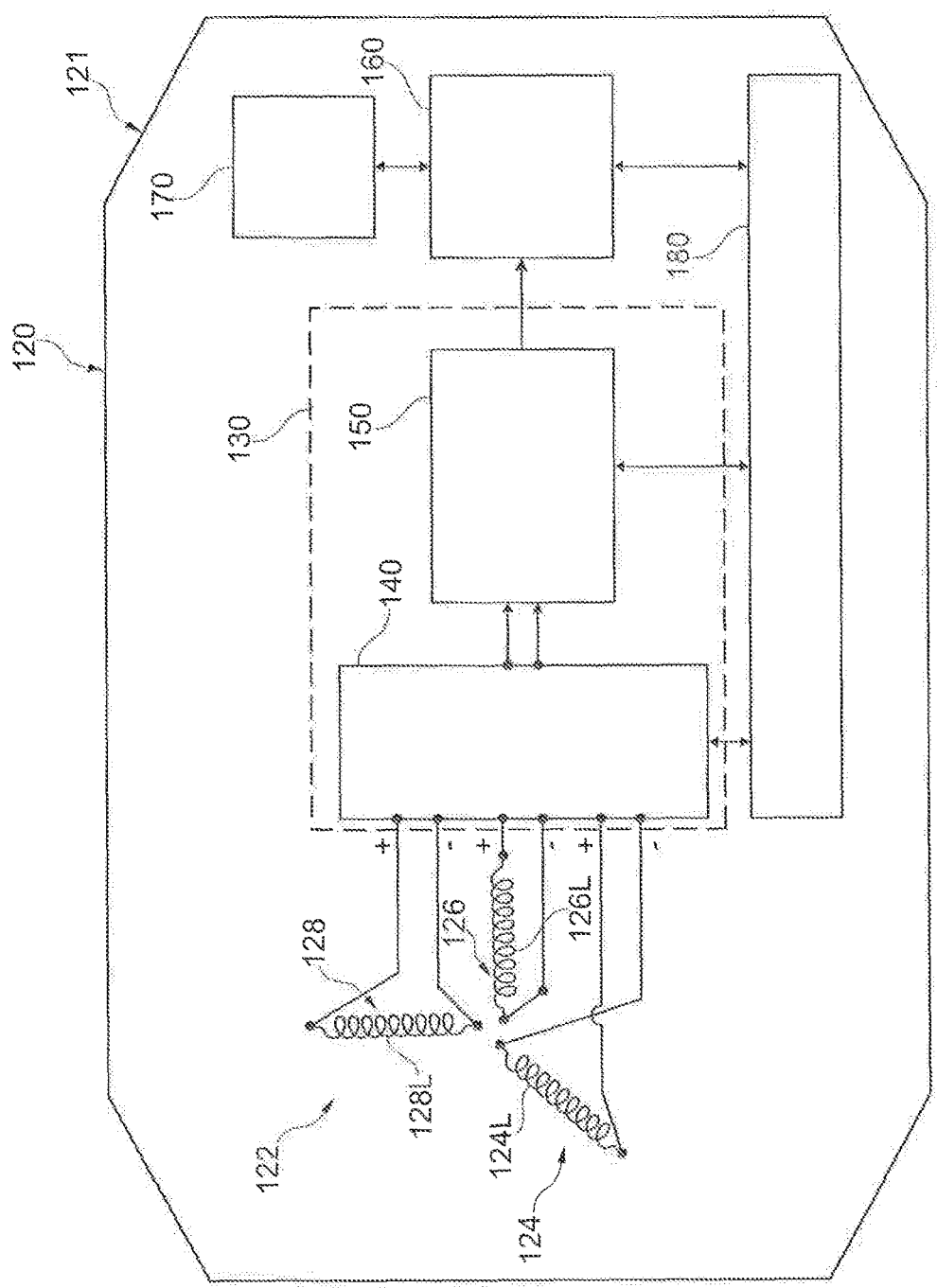
FIG. 2A shows a schematic block diagram of a mobile device, such as Passive Keyless Entry key device, according to an embodiment example of the invention.

FIG. 2A shows a schematic block diagram of a mobile device 120, such as PKE key device, according to an embodiment example of the invention. As shown in FIG. 2A, the mobile device 120 has, in addition to the 3D antenna 122 having the first, second and third coil antennas 124, 126, 128, a measurement device 130 including a switching network 140 and a signal processing chain 150, a storage device 160, an evaluation device 170, and a control device 180.

The signal processing chain 150 is generally operable to provide, in particular to provide sequentially, on the basis of the first, second and third low frequency signals $u_x$, $u_y$, and $u_z$ output from the first, second and third coil antennae 124, 126, 128 and the sum signal $u_S$, respectively, the following 3D field values relating to the magnetic field vector H: a first value $v_x$ indicative of the magnitude $|x|$ of the X-component x of the local magnetic field vector H based on the output first low frequency signal $u_x$, a second value $v_y$ indicative of the magnitude $|y|$ of the Y-component y of the local magnetic field vector H based on the output first low frequency signal $u_y$, a third value $v_z$ indicative of the magnitude $|z|$ of the Z-component z of the local magnetic field vector H based on the output first low frequency signal $u_z$, and further a sum value $v_S$ indicative of the magnitude of $|S|=|x+y+z|$ of the sum of the X-component x, the Y-component y, and the Z-component z of the local magnetic field vector H based on the output sum signal $u_S$.

The first value $v_x$, the second value $v_y$, the third value $v_z$, and the sum value $v_S$, when being output from the signal processing chain 150, are stored in the storage device 160, from where the values may be retrieved by the evaluation device 170 for subsequent evaluation, and, as necessary, by the control device 180 for use in the control of the operation of the measurement device 130 including the control (or switching) of the switching network 140, and the control of the operation of the elements of the signal processing chain 150.

Additional and/or alternative embodiments of circuit implementations of the measurement device 130, in particular the switching network 140, allow also to only select two of the three antennae, e.g. only the first and the second antenna 124 and 126, or only the second and the third antenna 126 and 128, or only the first and the third antenna 124 and 128, so as to provide respective sum values, which comprise $|x+y|$, $|y+z|$ and $|x+z|$. Further embodiment variants of the switching network 140 allow to switch the antennae 124, 126 and 128 such that sum values corresponding to inverse arithmetic operations can be provided, including for example |x−y|, |y−z| and |x−z|, by swapping the polarity of one or more out of the three antennae 124, 12 and 128 or by swapping the polarity of one or more out of the respective inputs to the switching network 140.

FIG. 26 shows a schematic block diagram of the 3D antenna 122 co-operating with the switching network 140 in the mobile device 120.

Figure 2B:
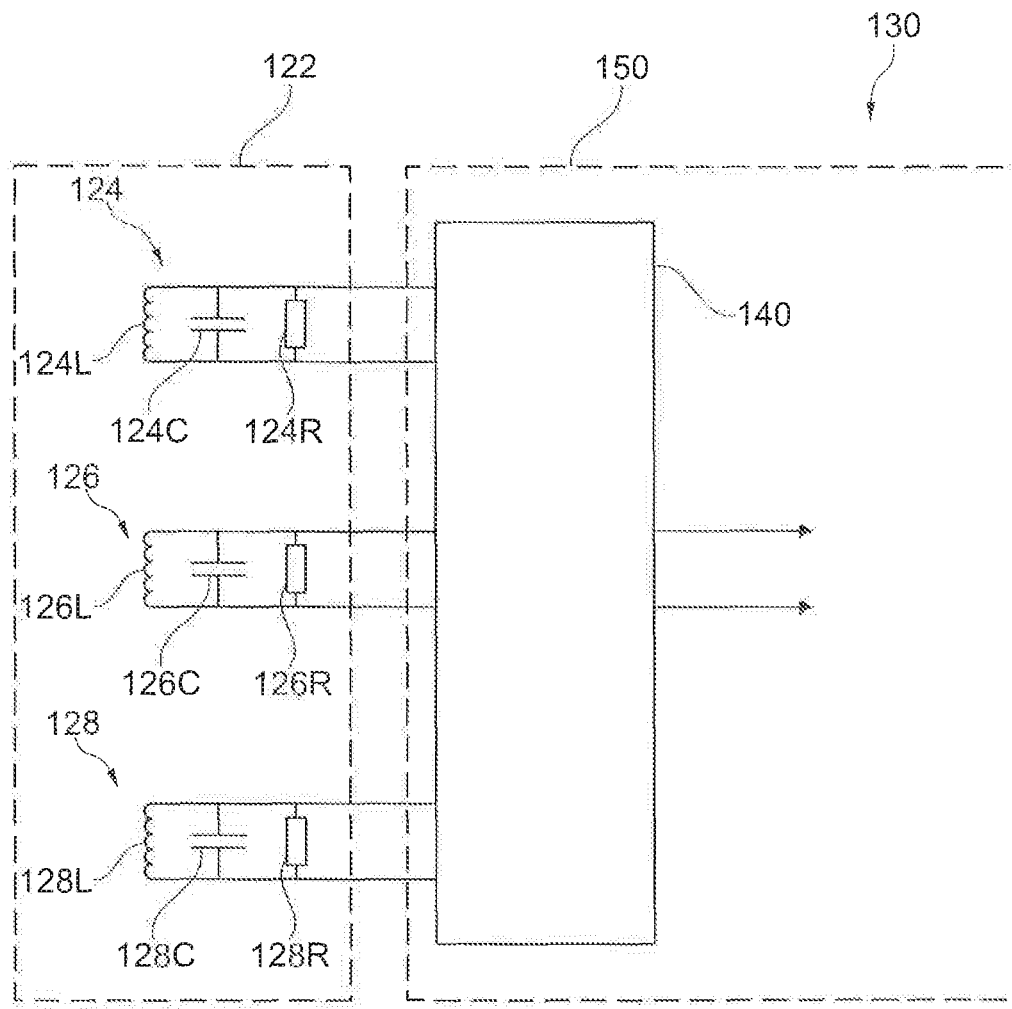
FIG. 2B shows a schematic block diagram of a 3D antenna co-operating with a switching network, in a mobile device, such as Passive Keyless Entry key device, according to an embodiment example of the invention.

As is shown in FIG. 2B, the first coil antenna 124 has a first antenna coil (or inductance) 124L and an impedance, which is electrically connected in parallel to the first antenna coil 124L, and which is composed of a first antenna resistor 124R and a first antenna capacitor 124C. Both the first antenna resistor 124R and the first antenna capacitor 124C are electrically connected in parallel to the first antenna coil 124L, and are dimensioned such that the first coil antenna 124 is resonant to the frequencies corresponding to the carrier frequencies of the electromagnetic fields, which are emitted by the first and the second base structure antennae 114 and 116, and which are substantially similar (or substantially same, except for system tolerances).

Likewise, the second coil antenna 126 has a second antenna coil (or inductance) 126L and an impedance, which is electrically connected in parallel to the second antenna coil 126L, and which is composed of a second antenna resistor 126R and a second antenna capacitor 126C. Both the second antenna resistor 126R and the second antenna capacitor 126C are electrically connected in parallel to the second antenna coil 126L, and are dimensioned such that also the second coil antenna 126 is resonant to the frequencies corresponding to the carrier frequencies of the electromagnetic fields, which are emitted by the first and the second base structure antennae 114 and 116.

Likewise further, the third coil antenna 128 has a third antenna coil (or inductance) 128L and an impedance, which is electrically connected in parallel to the third antenna coil 126L, and which is composed of a third antenna resistor 128R and a third antenna capacitor 128C. Both the third antenna resistor 128R and the third antenna capacitor 128C are electrically connected in parallel to the third antenna coil 128L, and are dimensioned such that also the third coil antenna 128 is also resonant to the frequencies corresponding to the carrier frequencies of the electromagnetic fields, which are emitted by the first and the second base structure antennae 114 and 116.

Each one of the first, second and third coil antennae 124, 126 and 128 outputs a respective low frequency signal, which is input to the switching network 140 and applied to two respective ports (labelled "+" and "−" in FIG. 2A) of the switching network 140, and which is indicative of a respective component of the magnetic field vector H. In particular, the first coil antenna 124 outputs a first low frequency signal $u_x$ indicative of the X-component x of the magnetic field vector H, the second coil antenna 126 outputs a second low frequency signal $u_y$ indicative of the Y-component y of the magnetic field vector H, and the third coil antenna 128 outputs a third low frequency signal $u_z$ indicative of the Z-component z of the magnetic field vector H.

Figure 4:
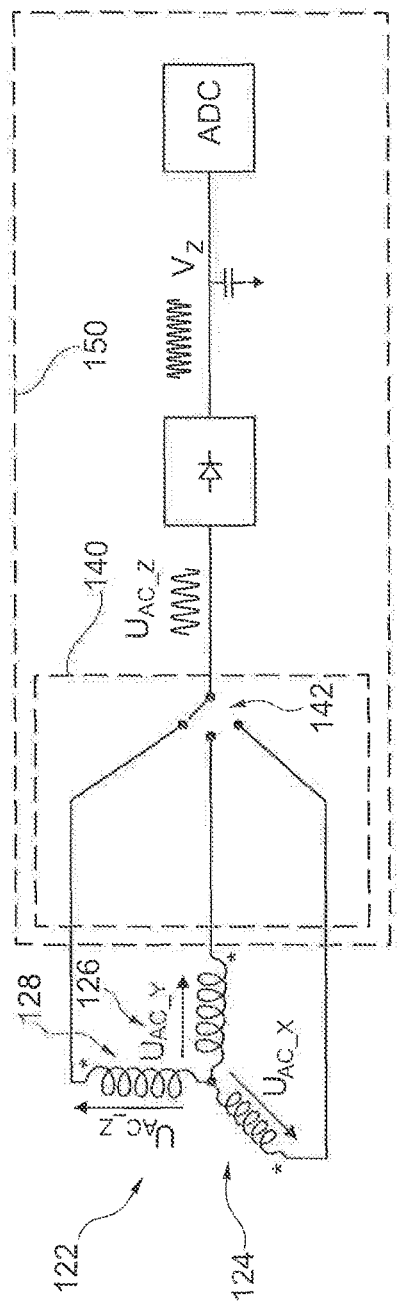
FIG. 4 shows a schematic block diagram of a 3D antenna co-operating with a conventional signal processing chain comprising a conventional switching network, in a conventional mobile device.

FIG. 4 shows a schematic block diagram of a 3D antenna 122 co-operating with a conventional signal processing chain 150 comprising a conventional switching network 140, in a conventional mobile device.

As is shown in FIG. 4, as a starting base for applying a hardware modification according to the invention to the mobile device 120, the conventional switching network 140 comprises a triple switch 142, as an embodiment of the switchable 3-to-1 multiplexer. The triple switch 142 is generally operable to switch sequentially the output signals, notably the first low frequency signal $u_x$ output from the first coil antenna 124, the second low frequency signal $u_y$ output from the second coil antenna 126, and the third low frequency signal $u_z$ output from the third coil antenna 128, to downstream elements of the signal processing chain 150.

In the state shown in FIG. 4, the triple switch 142 is set for example such that the third low frequency signal $u_z$ output from the third coil antenna 128 is transferred as an input (which is labelled $U_{AC\_Z}$ in FIG. 4) to the downstream elements of the signal processing chain 150. In a succeeding switching state, the triple switch 142 may be set for example such that the first low frequency signal $u_x$ output from the first coil antenna 124 is transferred as input to the downstream elements of the signal processing chain 150.

Figure 5A:
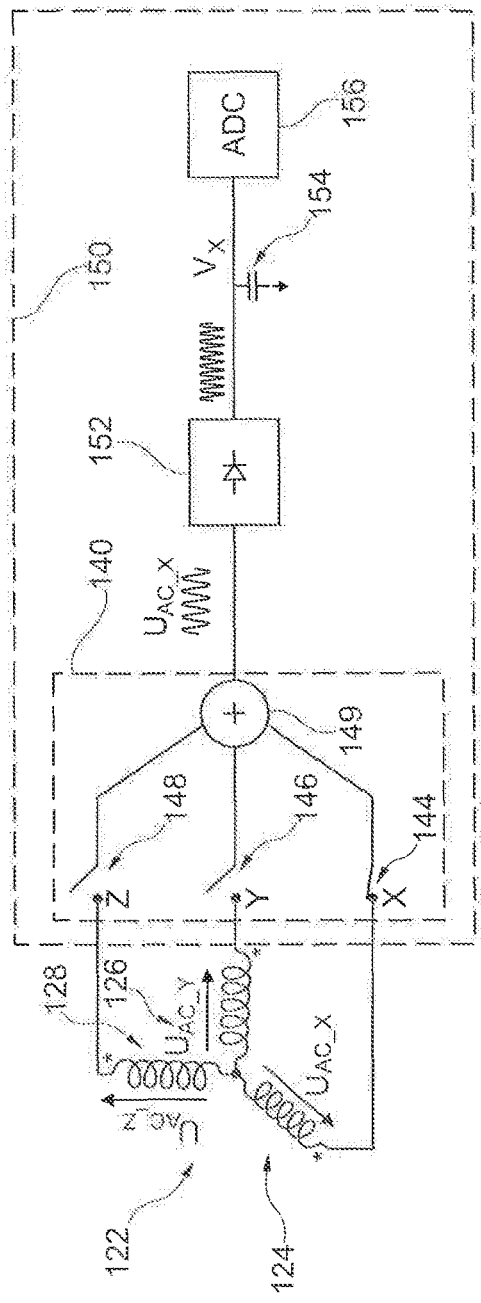
FIG. 5A shows a schematic block diagram of a 3D antenna co-operating with a signal processing chain comprising a first embodiment example of a switching network, in a mobile device, such as Passive Keyless Entry key device, according to an embodiment example of the invention, wherein the switching network is in a first switching state.

FIG. 5A shows a schematic block diagram of a 3D antenna 122 co-operating with a signal processing chain 150 comprising a first embodiment example of a switching network 140, in a mobile device 120 according to an embodiment example of the invention, wherein the switching network is in a first switching state explained below.

As is shown in FIG. 5A, the signal processing chain (150) according the first embodiment has a summing circuit 149; a first antenna switch 144, which is electrically connected serially to the first coil antenna 124, and between the first coil antenna 124 and the summing circuit 149; a second antenna switch 146, which is electrically connected serially to the second coil antenna 126, and between the second coil antenna 126 and the summing circuit 149; and a third antenna switch 146, which is electrically connected serially to the third coil antenna 128, and between the third coil antenna 128 and the summing circuit 149. The first, second and third coil antennae 124, 126 and 128 are electrically connected in parallel to each other.

The summing circuit 149 is generally operable to sum, as a function of the temporary opening or closing states of the first, second, and third antenna switches 144, 146 and 148, the first low frequency signal $u_x$ output from the first coil antenna 124, the second low frequency signal $u_y$ output from the second coil antenna 126, the third low frequency signal $u_z$ output from the third coil antenna 128 and/or the sum signal $u_S$ indicative of the sum |S|.

In the embodiment shown in the FIGS. 5A, 5B, 5C and 6, the signal processing chain 150 may be embodied as an RSSI chain, and may comprise a rectifying and amplifying circuit 152, embodied as an operational amplifier, a grounding capacitor 154, and analog to digital converter circuit 156. In the embodiment shown in the FIGS. 5A, 5B, 5C, an input of the rectifying and amplifying circuit 152 is electrically connected to the output of the summing circuit 149. An output of the rectifying and amplifying circuit 152 is a rectified low frequency signal, and is electrically connected to the one end of the grounding capacitor 154 and to an input of the analog to digital converter circuit 156. The other end of the grounding capacitor 154 is electrically connected to electrical ground. An output (not referenced) of the analog to digital converter circuit 156 may represent one of the first value $v_x$, the second value $v_y$, the third value $v_z$, and the sum value $v_s$, as a function of the switching state of the switching network 140, and is electrically connected for being transferable and input to the storage device 160 (as is the case for example in FIG. 2A), so that the first value $v_x$, the second value $v_y$, the third value $v_z$, and the sum value $v_s$ can be stored in the storage device 160.

The rectifying and amplifying circuit 152, implemented as an analogue circuit, is depicted in the FIGS. 5A, 5B, and 5C only for the purpose of an easier understanding. In alternative implementation embodiments of the processing chain 150, analogue circuits comprised in the processing chain 150 upstream of the analogue to digital converter 156 can also be omitted in the analogue domain and instead implemented in digital downstream of the analogue to digital converter. The purpose or desired functionality of such circuits is solely to determine the amplitude of the input signal.

In FIG. 5A, the switching network 140 is in the first switching state, in which the first antenna switch 144 is closed and the second antenna switch 146 and the third antenna switch 148 are open. Accordingly, in this switching state, only the first low frequency signal $u_x$ output from the first coil antenna 124 is input to the summing circuit 149, from where it is output and transferred to the downstream elements of the signal processing chain 150.

FIG. 5B shows a schematic block diagram of the 3D antenna 122 co-operating with a signal processing chain 150 comprising the first embodiment example of the switching network 150 in a mobile device 120, wherein the switching network is in a second switching state.

In FIG. 5B, the switching network 140 is in a second switching state, in which all of the first, second and third antenna switches 144, 146 and 148 are closed. Accordingly, in this switching state, all of the first low frequency signal $u_x$ output from the first coil antenna 124, the second low frequency signal $u_y$ output from the second coil antenna 126, and the third low frequency signal $u_z$ output from the third coil antenna 128 are input to the summing circuit 149. Accordingly, the summing circuit 149 is operable to sum the first, second and third low frequency signal $u_x$, $u_y$ and $u_z$, so as to output the sum signal $u_s$, for being transferred to the downstream elements of the signal processing chain 150.

FIG. 5C shows a schematic block diagram of the 3D antenna 122 co-operating with a signal processing chain 150 comprising the first embodiment example of the switching network 150 in a mobile device 120, wherein the switching network is in a third switching state.

In FIG. 5C, the switching network 140 is in a third switching state, in which all of the first, second and third antenna switches 144, 146 and 148 are closed. However, in contrast to the situation shown in FIG. 5B, the third coil antenna 128 is electrically connected within the 3D antenna 122 in a reverse switching direction, such that the polarity of the output signal $u_z$ is inverted to the negative as compared to the output signal $u_z$ output from the third coil antenna 128 in FIG. 5B. Accordingly, in this switching state, all of the first low frequency signal $u_x$ output from the first coil antenna 124, the second low frequency signal $u_y$ output from the second coil antenna 126, and the inverted third low frequency signal $u_z$ output from the third coil antenna 128 are input to the summing circuit 149. Accordingly, the summing circuit 149 is operable to sum the first, second and the negative of the third low frequency signal $u_x$, $u_y$ and $u_z$, so as to output a modified sum signal that is different from the sum signal $u_s$ that is output from summing circuit 149 in FIG. 5B. The modified sum signal is transferred to the downstream elements of the signal processing chain 150.

Figure 5D:
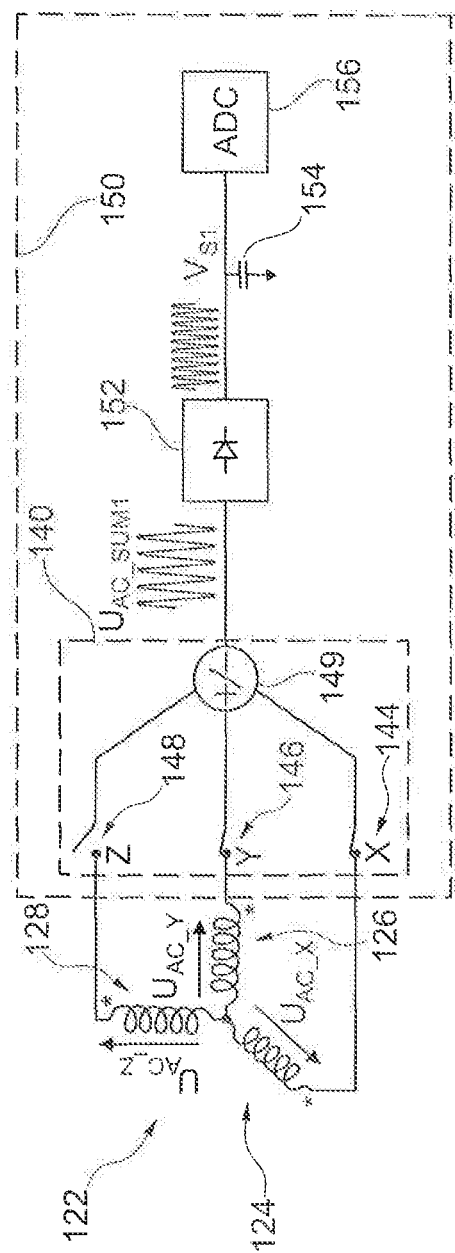
FIG. 5D shows a schematic block diagram of a 3D antenna co-operating with a signal processing chain comprising a first embodiment example of a switching network, in a mobile device, such as Passive Keyless Entry key device, according to an embodiment example of the invention, wherein the switching network is in a fourth switching state.

FIG. 5D shows a schematic block diagram of a 3D antenna co-operating with a signal processing chain comprising a first embodiment example of a switching network, in a mobile device, such as Passive Keyless Entry key device, according to an embodiment example of the invention, wherein the switching network is in a fourth switching state.

In FIG. 5D, the switching network 140 is in a fourth switching state, in which only two out of the three antenna switches 144, 146, 148 are closed. Namely, in FIG. 5D, only the first and second antenna switches 144 and 146 are closed. Accordingly, in this switching state, only the first low frequency signal $u_x$ output from the first coil antenna 124 and the second low frequency signal $u_y$ output from the second coil antenna 126 are input to the summing circuit 149. Accordingly, the summing circuit 149 is operable to sum only the first and the second low frequency signal $u_x$ and $u_y$, so as to output a modified sum signal, which is transferred to the downstream elements of the signal processing chain 150, so that a sum value corresponding to the arithmetic value |x+y| is provided.

The skilled person will easily understand that further switching states of the switching network 140, similar to the switching state shown in FIG. 5D, can be implemented, so that various modified sum values may be provided, comprising |x+y|, |y+z| and |x+z|. Furthermore, as has been discussed already above with reference to FIG. 2A, by swapping the polarity of one or more out of the three antennae 124, 12 and 128 or by swapping the polarity of one or more out of the respective inputs to the switching network 140, modified sum values implementing inverse arithmetic operations can be provided, which comprise for example |x−y|, |y−z| and |x−z|.

Figure 6:
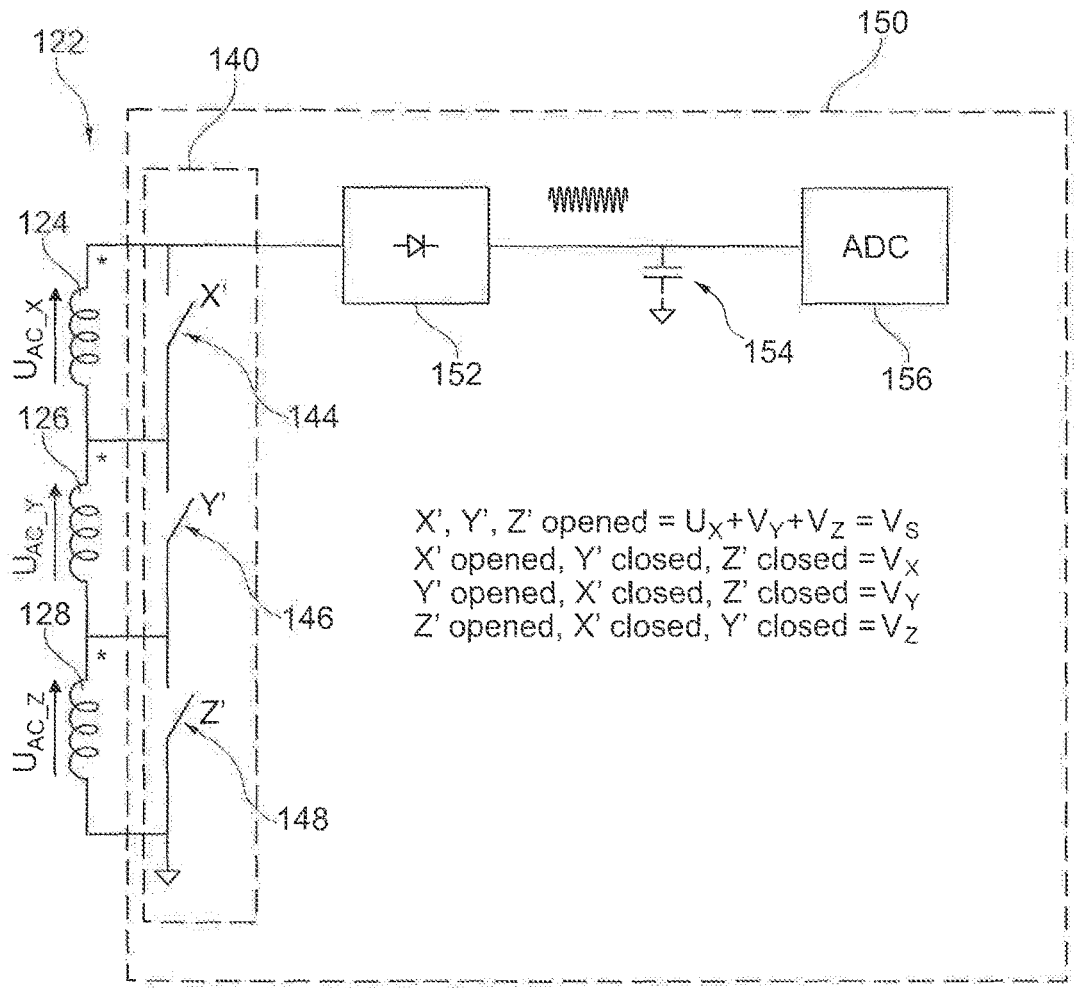
FIG. 6 shows a schematic block diagram of a 3D antenna co-operating with a signal processing chain comprising a second embodiment example of a switching network, in a mobile device, such as Passive Keyless Entry key device, according to an embodiment example of the invention.

FIG. 6 shows a schematic block diagram of a 3D antenna 122 co-operating with a signal processing chain 150 comprising a second embodiment example of a switching network 150, in the mobile device 120, such as Passive Keyless Entry key device, according to an embodiment example of the invention.

In the second embodiment of the signal processing chain 150 as shown in FIG. 6, the signal processing chain 150 has an input node (not referenced), which represents namely an input to the signal processing chain 150; a first antenna switch 144, which is electrically connected in parallel to the first coil antenna 124; a second antenna switch 146, which is electrically connected in parallel to the second coil antenna 126; and a third antenna switch 146, which is electrically connected in parallel to the third coil antenna 128. The first, second and third coil antennae 124, 126 and 128 are electrically connected serially in a series. The first antenna switch 144, the second antenna switch 146, and the third antenna switch 148 are connected serially in a series. The input node is electrically connected to the input of the rectifying and amplifying circuit 152 of the signal processing chain 150.

The input node is operable to receive, as a function of the temporary opening or closing states of the first, second, and third antenna switches (144, 146, 148), the first low frequency signal $u_x$ output from the first coil antenna (124), the second low frequency signal $u_y$ output from the second coil antenna (126), the third low frequency signal $u_z$ output from the third coil antenna (128) and/or the sum signal $u_S$ indicative of the sum |S|.

In FIG. 6, the switching network 140 is in a switching state, in which all of the first, second and third antenna switches 144, 146 and 148 are opened. Accordingly, in this switching state, all of the first low frequency signal $u_x$ output from the first coil antenna 124, the second low frequency signal $u_y$, output from the second coil antenna 126, and the third low frequency signal $u_z$ output from the third coil antenna 128 are summed because they are electrically connected in series, and input to the input node. Accordingly, the input node is operable to receive the sum of the first, second and third low frequency signal $u_x$, $u_y$ and $u_z$, so as to transfer the sum signal $u_s$, which is input to the downstream elements of the signal processing chain 150.

The skilled person may easily understand that the switching network 140 of FIG. 6 may be set in different switching states, as follows.

In another switching state, which is not shown in FIG. 6, only first antenna switch 144 is opened, and the second and the third antenna switches 146 and 148 are closed. Accordingly, the second and third low frequency signals $u_y$ and $u_z$ are short-circuited and do not contribute to the input for the input node. Hence, only the first low frequency signal $u_x$ output from the first coil antenna 124 is transferred (or summed), and input to the input node. Accordingly, the input node is operable to receive only first low frequency signal $u_x$. Hence, only this first low frequency signal $u_x$ is transferred and input to the downstream elements of the signal processing chain 150.

In still another switching state, which is not shown in FIG. 6, only second antenna switch 146 is opened, and the first and the third antenna switches 144 and 148 are closed. Accordingly, the first and third low frequency signals $u_x$ and $u_z$ are short-circuited and do not contribute to the input for the input node. Hence, only the second low frequency signal $u_y$ output from the second coil antenna 126 is transferred (or summed), and input to the input node. Accordingly, the input node is operable to receive only second low frequency signal $u_y$. Hence, only this second low frequency signal $u_y$ is transferred and input to the downstream elements of the signal processing chain 150.

In still another switching state, which is not shown in FIG. 6, only third antenna switch 148 is opened, and the first and the second antenna switches 144 and 146 are closed. Accordingly, the first and the second low frequency signals $u_x$ and $u_y$ are short-circuited and do not contribute to the input for the input node. Hence, only the third low frequency signal $u_z$ output from the third coil antenna 128 is transferred (or summed), and input to the input node. Accordingly, the input node is operable to receive only third low frequency signal $u_z$. Hence, only this third low frequency signal $u_z$ is transferred and input to the downstream elements of the signal processing chain 150.

FIG. 7 shows a schematic block diagram of a method 200 for operating a switching network 140 according to the first embodiment shown in the FIGS. 5A, 5B and 5C, in a mobile device 120, such as Passive Keyless Entry key device, according to an embodiment example of the invention.

The embodiment, as shown in FIG. 7, of the method 200 for measuring the 3D field values of the magnetic field H as present locally at the place of the 3D antenna 122 of the mobile 120 having the first embodiment of the switching network 140 shown in the FIGS. 5A, 5B and 5C starts with a step 205 of initiating the generating of low frequency magnetic field by an activated one of the first and second base structure antennae 114 and 116 of the PKE base structure device 110, and synchronizing the communication between the PKE base structure 110 and the mobile device 120. Thereafter, the activated one of the first and second base structure antennae 114 and 116 generates (at 207) bursts of the low frequency magnetic field.

While bursts of the low frequency magnetic field are emitted from the activated one of the first and second base structure antennae 114 and 116, the first switch 144 related to the first (or X-) antenna 124 is closed (at 210), which is followed by a step (at 215) of determining, which includes measuring the X-related first value $v_x$. Thereafter, the first switch 144 related to first (or X-) antenna 124 is opened (at 220), and simultaneously or immediately after the opening of the first switch 144, the second switch 146 related to the second (or Y-) antenna 126 is closed (at 225). This is followed by a step (at 230) of determining, which includes measuring the Y-related first value $v_y$. Thereafter, the second switch 146 related to second (or Y-) antenna 126 is opened (at 235), and simultaneously or immediately after the opening of the second switch 146, the third switch 148 related to the third (or Z-) antenna 128 is closed (at 240). This is followed by a step (at 245) of determining, which includes measuring the Z-related first value $v_z$.

Thereafter, the third switch 148 related to third (or Z-) antenna 128 is opened (at 250), and simultaneously or immediately after the opening of the third switch 148, all of the X-antenna, the Y-antenna and the Z-antenna related switches 144, 146, and 148 are closed (at 255). This is followed by a step (at 260) of determining, which includes measuring the sum value $v_s$ (at 260). Thereafter, all of the first, second and third switches (i.e. the switches 144, 146 and 146 related to first, second and third (i.e. the X-, y- and Z-) antennae 124, 126, 128 are opened (at 265).

The method 200 may then be repeated, wherein in the step 205 of initiating the generating of low frequency magnetic field, the other one of the first and second base structure antennae 114 and 116 of the PKE base structure device 110 is activated, and the communication between the PKE base structure 110 and the mobile device 120 is synchronized (at 205), whereafter the newly activated one of the first and second base structure antennae 114 and 116 generates (at 207) bursts of the low frequency magnetic field. Then, while the activated other one of the first and second base structure antennae 114 and 116 is activated and generates (at 207) bursts of the low frequency magnetic field, the method continues through the steps 210 to 265 again.

Supplementary, it is to be noted that "having" or "comprising" does not exclude other elements or steps, and that "a" or "an" does not exclude a plurality. In addition, it is to be noted that features or steps, which have been described above with reference to one of the above embodiment examples, may also be used in combination with other features or steps of other embodiment examples that have been described above. Reference numerals in the claims are not to be construed as limitations.

LIST OF REFERENCE NUMERALS

100 Passive Keyless Entry system
110 Passive Keyless Entry base structure
112 vehicle or car
114 first base structure antenna
116 second base structure antenna
120 mobile device
121 mobile Passive Keyless Entry key device
122 3D antenna
124 first coil antenna
124L first antenna coil
124C first antenna capacitor
124R first antenna resistor
126 second coil antenna
126L second antenna coil
126C second antenna capacitor
126R second antenna resistor
128 third coil antenna
128L third antenna coil
128C third antenna capacitor 128R third antenna resistor
130 measurement device
140 switching network
142 triple switch
144 first antenna switch
146 second antenna switch
148 third antenna switch
149 summing circuit
150 signal processing chain, e.g. RSSI chain
152 rectifying and amplifying circuit
154 grounding capacitor
156 analog to digital converter circuit
160 storage device
170 evaluation device
180 control device
200 method for measuring 3D field values of magnetic field
205 initiating generating low frequency magnetic field, and synchronizing communication between PKE base structure device and mobile device
207 generating bursts of low frequency magnetic field
210 closing X-antenna related switch
215 determining including measuring X-related first value $v_x$
220 opening X-antenna related switch
225 closing Y-antenna related switch
230 determining including measuring Y-related second value $v_y$
235 opening Y-antenna related switch
240 closing Z-antenna related switch
245 determining including measuring Z-related third value $v_z$
250 opening Z-antenna related switch
255 closing X-antenna, Y-antenna, and Z-antenna related switches
260 determining including measuring sum-related sum value $v_S$
265 opening X-antenna, Y-antenna, and Z-antenna related switches
300 relay system
310 receiving node
312 receiving node receiving antenna
314 receiving node relay antenna
320 transmission node
322 transmission node relay antenna
320 transmission node transmission antenna

The invention claimed is:

1. A mobile device, in particular a mobile Passive Keyless Entry (PKE), key device, for determining three dimensional (3D) field values of a magnetic field, and for use in a PKE system in co-operation with a PKE base structure, to which preferably the mobile device is associated and which has at least a first base structure antenna, which is operable to emit a, particularly low frequency, electromagnetic field, the mobile device having the following:

a 3D antenna, which is operable to sense a local magnetic field vector H=(x, y, z) of the electromagnetic field that is present locally at the position of the 3D antenna and has been emitted from the first base structure antenna, which 3D antenna has three coil antennas, which are arranged mutually perpendicular to each other, wherein each coil antenna points in a direction of one of the axes of a right-handed Cartesian coordinate system having an X-axis, a Y-axis, and a Z-axis, wherein the first coil antenna is associated with the X-axis and is operable to sense the X-component x of the local magnetic field vector H, and to output a first low frequency signal $u_x$ indicative of the X-component x of the magnetic field vector H, wherein the second coil antenna is associated with the Y-axis and is operable to sense the Y-component y of the local magnetic field vector H, and to output a second low frequency signal $u_y$ indicative of the Y-component y of the magnetic field vector H, wherein the third coil antenna is associated with the Z-axis and is operable to sense the Z-component z of the local magnetic field vector H, and to output a third low frequency signal $u_z$ indicative of the Z-component z of the magnetic field vector H, and wherein the 3D antenna is operable to measure a magnitude |S| of the sum |S|=|x+y+z| of the sum of the X-component x, the Y-component y, and the Z-component z of the local magnetic field vector H, and to output a sum signal $u_S$ indicative of the sum |S|; and a signal processing chain operable to provide, in particular sequentially, on the basis of the first, second and third low frequency signals $u_x$, $u_y$, and $u_z$ output from the first, second and third coil antenna and the sum signal $u_S$, respectively, the following 3D field values relating to the magnetic field vector H:

a first value $v_x$ indicative of the magnitude |x| of the X-component x of the local magnetic field vector H based on the output first low frequency signal $u_x$, a second value $v_y$ indicative of the magnitude |y| of the Y-component y of the local magnetic field vector H based on the output first low frequency signal $u_y$, a third value $v_z$ indicative of the magnitude |z| of the Z-component z of the local magnetic field vector H based on the output first low frequency signal $u_z$, and further a sum value $v_S$ indicative of the magnitude of |S|=|x+y+z| of the sum of the X-component x, the Y-component y, and the Z-component z of the local magnetic field vector H based on the output sum signal $u_S$.

2. The mobile device according to claim 1, wherein the signal processing chain has:

a summing circuit;
a first antenna switch, which is electrically connected serially to the first coil antenna, and between the first coil antenna and the summing circuit;
a second antenna switch, which is electrically connected serially to the second coil antenna, and between the second coil antenna and the summing circuit; and
a third antenna switch, which is electrically connected serially to the third coil antenna, and between the third coil antenna and the summing circuit;
wherein the first, second and third coil antennae are electrically connected in parallel to each other; and
wherein the summing circuit is operable to sum, as a function of the temporary opening or closing states of the first, second, and third antenna switches, the first low frequency signal $u_x$ output from the first coil antenna, the second low frequency signal $u_y$ output from the second coil antenna, the third low frequency signal $u_z$ output from the third coil antenna and/or the sum signal $u_S$ indicative of the sum |S|.

3. The mobile device according to claim 1, wherein the signal processing chain has:

an input node;
a first antenna switch, which is electrically connected in parallel to the first coil antenna;
a second antenna switch which is electrically connected in parallel to the second coil antenna; and a third antenna switch, which is electrically connected in parallel to the third coil antenna;

wherein the first, second and third coil antennae are electrically connected serially in a series, and the first antenna switch, a second antenna switch, and a third antenna switch are connected serially in a series; and wherein the input node is operable to receive, as a function of the temporary opening or closing states of the first, second, and third antenna switches, the first low frequency signal $u_x$ output from the first coil antenna, the second low frequency signal $u_y$ output from the second coil antenna, the third low frequency signal $u_z$ output from the third coil antenna and/or the sum signal $u_S$ indicative of the sum $|S|$.

4. The mobile device according to claim 1, wherein the PKE base structure has a second base structure antenna, which is arranged at a location of the PKE base structure that is different from the location of the first base structure antenna and which is operable to emit a, particularly low frequency, electromagnetic field, wherein the first and the second base structure antennae are operable to emit, respectively, a first and a second electromagnetic field, wherein the signal processing chain is operable to determine, particularly sequentially, the 3D field values, which relate to a first magnetic field vector $H_1$, present locally at the position of the 3D antenna, of the low frequency electromagnetic field emitted from the first base structure antenna, and which comprise the following: the first value $v_{x,1}$, the second value $v_{y,1}$, the third value $v_{z,1}$, and the sum value $v_{S1}$ relating to the first magnetic field vector $H_1$; and wherein the signal processing chain is further operable to determine, particularly sequentially, the 3D field values, which relate to a second magnetic field vector $H_2$, present locally at the position of the 3D antenna, of the low frequency electromagnetic field emitted from the second base structure antenna, and which comprise the following: the first value $v_{x,2}$, the second value $v_{y,2}$, the third value $v_{z,2}$, and the sum value $v_{S,2}$ relating to the second magnetic field vector $H_2$.

5. The MOBILE device according to claim 1, further having a storage device, which is operable to store at least the 3D field values relating to the first magnetic field vector $H_1$, namely: the first value $v_{x,1}$, the second value $v_{y,1}$, the third value $v_{z,1}$, and the sum value $v_{S1}$;

wherein preferably the storage device is further operable to store the 3D field values relating to the second magnetic field vector $H_2$, namely: the first value $v_{x,2}$, the second value $v_{y,2}$, the third value $v_{z,2}$, and the sum value $v_{S2}$.

6. An evaluation device, for use in a Passive Keyless Entry (PKE) system having a Mobile device, in particular a mobile Passive Keyless Entry, PKE, key device, for determining three dimensional (3D) field values of a magnetic field vector H, and a PKE base structure, to which preferably the mobile device is associated and which comprises at least a first base structure antennae, which is operable to emit a, particularly low frequency, electromagnetic field, wherein the evaluation device is operable to a) receive a first value $v_x$ indicative of the local X-component x of the magnetic field vector H;

b) receive a second value $v_y$ indicative of the local Y-component y of the magnetic field vector H;

c) receive a third value $v_z$ indicative of the local Z-component z of the magnetic field vector H;

d) receive a sum value $v_S$ indicative of the local magnitude of $|S|=x+y+z$ of the sum of the X-component x, the Y-component y, and the Z-component z of the magnetic field vector H; and e) calculate the following set of candidates $\{C_i | i \in \{1, 2, 3, 4\}\}$ of sum values—relating to the magnetic field vector H:

$|C_1|=|+|v_{x,1}|+|v_{y,1}|+|v_{z,1}||$, $|C_2|=|+|v_{x,1}|+|v_{y,1}|-|v_{z,1}||$, $|C_3|=|+|v_{x,1}|-|v_{y,1}|+|v_{z,1}||$, and $|C_4|=|-|v_{x,1}|+|v_{y,1}|+|v_{z,1}||$, wherein each one of the set of candidates $\{C_{i,1} | i \in \{1, 2, 3, 4\}\}$ is associated with a particular one of the set of sign combinations $\{(\text{sign\_}x_i, \text{sign\_}y_i, \text{sign\_}z_i) | i \in \{1, 2, 3, 4\}$ of the following set of sign combinations:

$(\text{sign\_}x_1, \text{sign\_}y_1, \text{sign\_}z_1)=(+,+,+)$, $(\text{sign\_}x_2, \text{sign\_}y_2, \text{sign\_}z_2)=(+,+,-)$, $(\text{sign\_}x_3, \text{sign\_}y_3, \text{sign\_}z_3)=(+,-,+)$, $(\text{sign\_}x_4, \text{sign\_}y_4, \text{sign\_}z_4)=(-,+,+)$.

7. The evaluation device according to claim 6, further being operable to f) determine that one of the candidates $\{C_{i,1} | i \in \{1, 2, 3, 4\}\}$ of sum values out of the set $\{|C_{1,1}|, |C_{2,1}|, |C_{3,1}|, |C_{4,1}|\}$, which is closest to the sum value $|v_S|$ relating to the magnetic field vector H of the electromagnetic field;

g) apply that one of the sign combinations associated with the one candidate sum value, which in step f) yielded the smallest distance to the sum value $|v_S|$, to the set, which includes the magnitudes $|v_x|$, $|v_y|$, and $|v_z|$ of the first value, the second value, and the third value, respectively so as to yield a vector $V=\pm(\text{sign}_i\_x \cdot v_x, \text{sign\_}y_i \cdot v_y, \text{sign\_}z_i \cdot v_z)$; and h) provide the vector V yielded in result of the operability f) as a vector, which has the direction of the magnetic field vector H.

8. The evaluation device according to claim 7, wherein the PKE base structure further has a second base structure antennae, which is arranged at a location of the PKE base structure that is different from the location of the first base structure antenna, and which is operable to emit a, particularly low frequency, electromagnetic field, wherein the first and the second base structure antennae are operable to emit, respectively, a first and a second electromagnetic field, the evaluation device further being operable to i) perform the respective steps a) to h), which receive the 3D field values relating to a first magnetic field vector $H_1$ of the magnetic field emitted from a first base structure antenna and provide the vector $V_1$ having the direction of the magnetic field vector $H_1$, using the 3D field quantities relating to the second magnetic field vector $H_2$ of the magnetic field emitted from the second base structure antenna, so as to yield a second vector $V_2$, which has the direction of the magnetic field vector $H_2$;

j) determine the angle α between the first vector $V_1$ and the second vector $V_2$;

k) comparing the determined angle α with a small threshold angle $α_t$, wherein for example the threshold angle $\alpha_t$, is 5°, preferably 4°, more preferably 3°, still more preferably 2°, and still more preferably 1°; and l) determining that a one-dimensional Relay Station Attack has occurred, if the determined angle $\alpha$ is equal to or smaller than the threshold angle $\alpha_t$, i.e. $\alpha \leq \alpha_t$; and m) preferably determine that a regular wireless connection has been established between the PKE base structure and the associated mobile device, if the determined angle $\alpha$ is greater than the threshold angle $\alpha_t$, i.e. $\alpha > \alpha_t$.

9. The evaluation device according to claim 7, wherein the evaluation device is arranged in the mobile device.

10. The evaluation device according to claim 7, wherein the evaluation device is arranged in the PKE base structure.

11. A Passive Keyless Entry (PKE) system having:
a PKE base structure, in particular one of a building and a vehicle, which comprises at least a first and a second base structure antenna, which are arranged at different locations of the PKE base structure and are each operable to emit a low frequency electromagnetic field; and
a mobile device in particular a mobile Passive Keyless Entry, PKE, key device according to claim 1; and
wherein preferably the mobile device is associated to the PKE base structure.

12. A Passive Keyless Entry (PKE) system having:
a PKE base structure, in particular one of a building and a vehicle, which comprises at least a first and a second base structure antenna, which are arranged at different locations of the PKE base structure and are each operable to emit a low frequency electromagnetic field;
a mobile device, in particular a mobile Passive Keyless Entry, PKE, key device according to claim 1; and
wherein preferably the mobile device is associated to the PKE base structure.

13. A method for determining the direction of a magnetic field vector H of a, particularly low frequency, magnetic field H=(x, y, z), which is present locally at a position of a three dimensional (3D) antenna, for example of a mobile device, such as a mobile Passive Keyless Entry System (PKE), key device, of a, particularly low frequency, electromagnetic field emitted from an antenna, such as a base structure antenna of a PKE base structure, wherein the method has the following steps:

receiving a first value $v_x$ indicative of the local X-component x of a magnetic field vector H, a) receiving a first value $v_x$ indicative of the local X-component x of the magnetic field vector H, b) receiving a second value $v_y$ indicative of the local Y-component y of the magnetic field vector H, c) receiving a third value $v_z$ indicative of the local Z-component z of the magnetic field vector H, d) receiving a sum value $v_S$ indicative of the local magnitude of $|S|=|x+y+z|$ of the sum of the X-component x, the Y-component y, and the Z-component z of the magnetic field vector H, e) calculating the following set of candidates $\{C_i | i \in \{1, 2, 3, 4\}\}$ of sum values—relating to the magnetic field vector H:

$|C_1|=|+|v_{x,1}|+|v_{y,1}|+|v_{z,1}||$, $|C_2|=|+|v_{x,1}|+|v_{y,1}|-|v_{z,1}||$, $|C_3|=|+|v_{x,1}|-|v_{y,1}|+|v_{z,1}||$, and $|C_4|=|-|v_{x,1}|+|v_{y,1}|+|v_{z,1}||$, wherein each one of the set of candidates $\{C_{i,1} | i \in \{1, 2, 3, 4\}\}$ is associated with a particular one of the set of sign combinations $\{(\text{sign\_}x_i, \text{sign\_}y_i, \text{sign\_}z_i) | i \in \{1, 2, 3, 4\}$ of the following set of sign combinations:

$(\text{sign\_}x_1, \text{sign\_}y_1, \text{sign\_}z_1) = (+,+,+)$, $(\text{sign\_}x_2, \text{sign\_}y_2, \text{sign\_}z_2) = (+,+,-)$, $(\text{sign\_}x_3, \text{sign\_}y_3, \text{sign\_}z_3) = (+,-,+)$, $(\text{sign\_}x_4, \text{sign\_}y_4, \text{sign\_}z_4) = (-,+,+)$;

f) determining that one of the candidates $\{C_{i,1} | i \in \{1, 2, 3, 4\}\}$ of sum values out of the set $\{|C_{1,1}|, |C_{2,1}|, |C_{3,1}|, |C_{4,1}|\}$, which is closest to the sum value $|v_S|$ relating to the magnetic field vector H of the electromagnetic field; and g) applying that one of the sign combinations associated with the one candidate sum value, which in step f) yielded the smallest distance to the sum value $|v_S|$, to the set, which includes the magnitudes $|v_x|$, $|v_y|$, and $|v_z|$ of the first value, the second value, and the third value, respectively, so as to yield a vector $V = \pm (\text{sign}_i \cdot x \cdot v_x, \text{sign\_}y_i \cdot v_y, \text{sign\_}z_i \cdot v_z)$; and h) providing the vector V yielded in step f) as a vector, which has the direction of the magnetic field vector H.

14. The method according to claim 13, further having the steps:

i) performing the respective steps a) to h), which receive the 3D field values relating to a first magnetic field vector $H_1$ of the magnetic field emitted from a first base structure antenna and provide the vector $V_1$ having the direction of the magnetic field vector $H_1$, using the 3D field quantities relating to the second magnetic field vector $H_2$ of the magnetic field emitted from the second base structure antenna, so as to yield a second vector $V_2$, which has the direction of the magnetic field vector $H_2$;

j) determining the angle $\alpha$ between the first vector $V_1$ and the second vector $V_2$;

k) comparing the determined angle $\alpha$ with a small threshold angle $\alpha_t$, wherein for example the threshold angle $\alpha_t$, is 5°, preferably 4°, more preferably 3°, still more preferably 2°, and still more preferably 1°; and l) determining that a one-dimensional Relay Station Attack has occurred, if the determined angle $\alpha$ is equal to or smaller than the threshold angle $\alpha_t$, i.e. $\alpha \leq \alpha_t$; and m) preferably determining that a regular wireless connection has been established between the PKE base structure and the associated mobile device, if the determined angle $\alpha$ is greater than the threshold angle $\alpha_t$, i.e. $\alpha > \alpha_t$.

15. A non-transitory computer-readable storage medium storing a computer program for controlling or executing the method according to claim 12, when run on a data processing system, such as a processor, a micro-processor, or a computer.

16. A non-transitory computer-readable storage medium storing a computer program for controlling or executing the method according to claim 13, when run on a data processing system, such as a processor, a micro-processor, or a computer.

* * * * *